United States Patent
Wang et al.

(10) Patent No.: US 10,728,073 B2
(45) Date of Patent: Jul. 28, 2020

(54) COMPUTER GENERATED SEQUENCE DESIGN AND HYPOTHESIS MAPPING

(71) Applicant: QUALCOMM Incorporated, San Diego, CA (US)

(72) Inventors: Renqiu Wang, San Diego, CA (US); Seyong Park, San Diego, CA (US); Yi Huang, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/146,639

(22) Filed: Sep. 28, 2018

(65) Prior Publication Data

US 2019/0104007 A1 Apr. 4, 2019

Related U.S. Application Data

(60) Provisional application No. 62/567,213, filed on Oct. 2, 2017.

(51) Int. Cl.
*H04W 72/12* (2009.01)
*H04L 27/26* (2006.01)
*H04W 72/04* (2009.01)
*H04L 1/18* (2006.01)
*H04L 5/00* (2006.01)
*H04W 76/27* (2018.01)
*H04L 25/02* (2006.01)
(Continued)

(52) U.S. Cl.
CPC ........ *H04L 27/2614* (2013.01); *H04L 1/1812* (2013.01); *H04L 5/0007* (2013.01);
(Continued)

(58) Field of Classification Search
CPC ............. H04L 27/2614; H04L 25/0224; H04L 5/0007; H04L 5/0048; H04L 5/0055;
(Continued)

(56) References Cited

U.S. PATENT DOCUMENTS

| | | | |
|---|---|---|---|
| 2009/0285337 A1* | 11/2009 | Cheng | H04L 23/02 375/343 |
| 2018/0076917 A1* | 3/2018 | Pan | H04B 7/0639 |
| 2019/0132859 A1* | 5/2019 | Han | H04L 5/0055 |

OTHER PUBLICATIONS

Huawei et al., "Short PUCCH for UCI of up to 2 Bits", 3GPP Draft, R1-1715399, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017,1-17 Pages (Year: 2017).*

(Continued)

*Primary Examiner* — Edan Orgad
*Assistant Examiner* — Malick A Sohrab
(74) *Attorney, Agent, or Firm* — Patterson + Sheridan, LLP

(57) ABSTRACT

Certain aspects of the present disclosure relate to methods and apparatus generating sequences and mapping cyclic shifts of the sequences to hypotheses for short burst transmissions, for example, in new radio (NR) technologies. An exemplary method includes selecting a computer generated sequence (CGS), from a plurality of CGSs; determining, based on different values of uplink control information (UCI) and a first shift index assigned to the transmitter, a shift to apply to the CGS; and transmitting the selected CGS, with the determined shift applied, in a short physical uplink control channel (PUCCH) to indicate the UCI.

14 Claims, 17 Drawing Sheets

(51) Int. Cl.
*H04W 4/70* (2018.01)
*H04B 7/0413* (2017.01)
(52) U.S. Cl.
CPC .......... *H04L 5/0037* (2013.01); *H04L 5/0048* (2013.01); *H04L 5/0053* (2013.01); *H04L 5/0055* (2013.01); *H04L 25/0224* (2013.01); *H04L 27/2602* (2013.01); *H04L 27/2607* (2013.01); *H04W 72/0413* (2013.01); *H04W 76/27* (2018.02); *H04B 7/0413* (2013.01); *H04L 5/0016* (2013.01); *H04W 4/70* (2018.02)
(58) Field of Classification Search
CPC . H04L 1/1812; H04L 27/2607; H04L 5/0016; H04L 27/2602; H04L 5/0053; H04L 5/0037; H04L 1/00–1896; H04W 76/27; H04W 72/0413; H04W 4/70; H04B 7/0413
See application file for complete search history.

(56) References Cited

OTHER PUBLICATIONS

CATT: "On Short PUCCH Formats Supporting up to Two UCI Bits", 3GPP Draft, R1-1715817, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017 (Sep. 17, 2017), XP051339277, 4 Pages, Retrieved from the Internet: URL:http://www.3gpp.org/ftp/Meetings_3GPP_SYNC/RAN1/Docs/ [retrieved on Sep. 17, 2017].
Huawei et al., "Short PUCCH for UCI of up to 2 Bits", 3GPP Draft, R1-1715399, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017 (Sep. 17, 2017), XP051338867, 17 Pages, Retrieved from the Internet: URL:http://www.3gpp.org/ftp/Meetings_3GPP_SYNC/RAN1/Docs/ [retrieved on Sep. 17, 2017].
International Search Report and Written Opinion—PCT/US2018/053663—ISA/EPO—dated Jan. 16, 2019.
Qualcomm Incorporated: "Channelization of 1-Symbol Short PUCCH With 1 or 2 Bits Payload", 3GPP Draft, R1-1716419, Channelization of 1-Symbol Short PUCCH With 1 or 2 Bits Payload, 3rd Generation Partnership Project (3GPP), Mobile Competence Centre, 650, Route Des Lucioles, F-06921 Sophia-A, vol. RAN WG1, No. Nagoya, JP, Sep. 18, 2017-Sep. 21, 2017, Sep. 17, 2017 (Sep. 17, 2017), XP051339874, 16 Pages, Retrieved from the Internet: URL:http://www.3gpp.org/ftp/Meetings_3GPP_SYNC/RAN1/Docs/ [retrieved on Sep. 17, 2017].

* cited by examiner

1100

| Sequence index | $u \cdot \exp(\pi \cdot j \cdot x(n)/4), i = 0,1,2,..,2N-1$ | CM (dB) | PAPR (dB) |
|---|---|---|---|
| 0 | -3  1 -1  3  3 -1  1 -3 -3 -3 -3 -3 | 0.2051 | 2.3349 |
| 1 | -3  1  3 -1 -1  3  1 -3 -3 -3 -3 -3 | 0.2051 | 2.3349 |
| 2 | -3 -3 -3 -3 -3  1 -1 -3  3 -3  1 -3 | 0.2051 | 2.3349 |
| 3 | -3 -3 -3 -3 -3  1  3 -1 -1  3  1 -3 | 0.2051 | 2.3349 |
| 4 | -3  1 -1  3  3 -3 -3  3  3 -1  1 -3 | 0.2777 | 2.5195 |
| 5 | -3  1  3 -1 -1 -3 -3 -1 -1  3  1 -3 | 0.2777 | 2.5195 |
| 6 | -3  1 -1 -1  3  1  1  3 -1 -1  1 -3 | 0.2777 | 2.5195 |
| 7 | -3  1  3  3 -1  1  1 -1  3  3  1 -3 | 0.2777 | 2.5195 |
| 8 | -3  1 -1 -1  3  3 -3 -1 -1 -3 -1 -3 | 0.3331 | 2.5436 |
| 9 | -3 -1 -3 -1 -1 -3  3  3 -1 -1  1 -3 | 0.3331 | 2.5436 |
| 10 | -3  3 -3  3  3 -3 -1 -1  3  3  1 -3 | 0.3331 | 2.5436 |
| 11 | -3  1  3  3 -1 -1 -3  3  3 -3  3 -3 | 0.3331 | 2.5436 |
| 12 | -3 -1  1 -3  3 -3 -3  3 -1 -1 -1 -3 | 0.4355 | 2.5501 |
| 13 | -3 -1 -1 -1  3 -3 -3  3 -3  1 -1 -3 | 0.4355 | 2.5501 |
| 14 | -3  3  3  3 -1 -3 -3 -1 -3  1  3 -3 | 0.4355 | 2.5501 |

FIG. 11A

| | | | |
|---|---|---|---|
| 15 | -3  3  1 -3 -1 -3 -3 -1  3  3  3 -3 | 0.4355 | 2.5501 |
| 16 | -3 -3 -3 -3 -3  1 -3  1 -3  1  1 -3 | 0.8778 | 2.5930 |
| 17 | -3  1  1 -3 -1 -3  1 -3 -3 -3 -3 -3 | 0.8778 | 2.5930 |
| 18 | -3  1 -3 -1  3  1 -1 -1 -1  3  3 -3 | 0.5700 | 2.6023 |
| 19 | -3  1 -3  3 -1  1  3  3  3 -1 -1 -3 | 0.5700 | 2.6023 |
| 20 | -3 -3 -3  1  1 -3  1 -3 -3 -3  1 -3 | 0.8460 | 2.6208 |
| 21 | -3  1 -3 -3 -3  1 -3  1  1 -3 -3 -3 | 0.8460 | 2.6208 |
| 22 | -3  1 -3  1  1  1  1 -3  1  1 -3 -3 | 0.6886 | 2.7222 |
| 23 | -3 -3  1  1 -3  1  1  1  1 -3  1 -3 | 0.6886 | 2.7222 |
| 24 | -3  3 -1  3 -1  1 -3 -3 -1 -1 -3 -3 | 0.7057 | 2.8120 |
| 25 | -3 -1  3 -1  3  1 -3 -3  3  3 -3 -3 | 0.7057 | 2.8120 |
| 26 | -3 -3  3  3 -3 -3  1  3 -1  3 -1 -3 | 0.7057 | 2.8120 |
| 27 | -3 -3 -1 -1 -3 -3  1 -1  3 -1  3 -3 | 0.7057 | 2.8120 |
| 28 | -3 -3 -1 -3  1 -1 -1  1  3 -1 -1 -3 | 0.8778 | 2.9787 |
| 29 | -3 -3  3 -3  1  3  3  1 -1  3  3 -3 | 0.8778 | 2.9787 |

| x(n) | | | | | | | | | | | |
|---|---|---|---|---|---|---|---|---|---|---|---|
| -3 | -1 | -1 | 3 | 1 | -1 | -1 | 1 | -3 | -1 | -3 | -3 |
| -3 | 3 | 3 | -1 | 1 | 3 | 3 | 1 | -3 | 3 | -3 | -3 |
| -3 | 1 | 1 | 3 | 1 | 1 | -3 | -3 | 1 | -1 | 1 | -3 |
| -3 | -3 | -3 | 1 | -3 | -3 | 1 | -3 | 1 | 1 | 1 | -3 |
| -3 | -1 | 1 | -1 | 3 | 3 | 1 | 3 | 1 | 1 | 1 | -3 |

| u | X(0),... X(5) | | | | | |
|---|---|---|---|---|---|---|
| 0 | -3 | -1 | 3 | 3 | -1 | -3 |
| 1 | -3 | 3 | -1 | -1 | 3 | -3 |
| 2 | -3 | -3 | -3 | 3 | 1 | -3 |
| 3 | 1 | 1 | 1 | 3 | -1 | -3 |
| 4 | 1 | 1 | 1 | -3 | -1 | 3 |
| 5 | -3 | 1 | -1 | -3 | -3 | -3 |
| 6 | -3 | 1 | 3 | -3 | -3 | -3 |
| 7 | -3 | -1 | 1 | -3 | 1 | -1 |
| 8 | -3 | -1 | -3 | 1 | -3 | -3 |
| 9 | -3 | -3 | 1 | -3 | 3 | -3 |
| 10 | -3 | 1 | 3 | 1 | -3 | -3 |
| 11 | -3 | -1 | -3 | 1 | 1 | -3 |
| 12 | 1 | 1 | 3 | -1 | -3 | 3 |
| 13 | 1 | 1 | 3 | 3 | -1 | 3 |
| 14 | 1 | 1 | 1 | -3 | 3 | -1 |
| 15 | 1 | 1 | 1 | -1 | 3 | -3 |
| 16 | -3 | -1 | -1 | -1 | 3 | -1 |
| 17 | -3 | -3 | -1 | 1 | -1 | -3 |
| 18 | -3 | -3 | -3 | 1 | -3 | -1 |
| 19 | -3 | 1 | 1 | -3 | -1 | -3 |
| 20 | -3 | 3 | -3 | 1 | 1 | -3 |
| 21 | -3 | 1 | -3 | -3 | -3 | -1 |
| 22 | 1 | 1 | -3 | 3 | 1 | 3 |
| 23 | 1 | 1 | -3 | -3 | 1 | -3 |
| 24 | 1 | 1 | 3 | -1 | 3 | 3 |
| 25 | 1 | 1 | -3 | 1 | 3 | 3 |
| 26 | 1 | 1 | -1 | -1 | 3 | -1 |
| 27 | 1 | 1 | -1 | 3 | -1 | -1 |
| 28 | 1 | 1 | -1 | 3 | -3 | -1 |
| 29 | 1 | 1 | -3 | 1 | -1 | -1 |

| u | X(0),... X(11) | | | | | | | | | | | |
|---|---|---|---|---|---|---|---|---|---|---|---|---|
| 0 | -3 | 1 | -3 | -3 | -3 | 3 | -3 | -1 | 1 | 1 | 1 | -3 |
| 1 | -3 | 3 | 1 | -3 | 1 | 3 | -1 | -1 | 1 | 3 | 3 | 3 |
| 2 | -3 | 3 | 3 | 1 | -3 | 3 | -1 | 1 | 3 | -3 | 3 | -3 |
| 3 | -3 | -3 | -1 | 3 | 3 | 3 | -3 | 3 | -3 | 1 | -1 | -3 |
| 4 | -3 | -1 | -1 | 1 | 3 | 1 | 1 | -1 | 1 | -1 | -3 | 1 |
| 5 | -3 | -3 | 3 | 1 | -3 | -3 | -3 | -1 | 3 | -1 | 1 | 3 |
| 6 | 1 | -1 | 3 | -1 | -1 | -1 | -3 | -1 | 1 | 1 | 1 | -3 |
| 7 | -1 | -3 | 3 | -1 | -3 | -3 | -3 | -1 | 1 | -1 | 1 | -3 |
| 8 | -3 | -1 | 3 | 1 | -3 | -1 | -3 | 3 | 1 | 3 | 3 | 1 |
| 9 | -3 | -1 | -1 | -3 | -3 | -1 | -3 | 3 | 1 | 3 | -1 | -3 |
| 10 | -3 | 3 | -3 | 3 | 3 | -3 | -1 | -1 | 3 | 3 | 1 | -3 |
| 11 | -3 | -1 | -3 | -1 | -1 | -3 | 3 | 3 | -1 | -1 | 1 | -3 |
| 12 | -3 | -1 | -3 | -3 | -3 | -1 | -3 | -1 | -1 | -3 | 3 | 3 |
| 13 | -3 | 1 | -1 | -1 | 3 | 3 | -3 | -1 | -3 | -1 | -3 |
| 14 | 1 | 3 | -3 | -1 | 3 | 3 | 1 | -1 | 1 | -1 | 3 |
| 15 | -3 | 1 | 3 | -1 | -1 | -3 | -3 | -1 | -1 | 3 | 1 | -3 |
| 16 | -1 | -1 | -1 | -1 | 1 | -3 | -1 | 3 | 3 | -1 | -3 | 1 |
| 17 | -1 | 1 | 1 | -1 | 1 | 3 | 3 | -1 | -1 | -3 | 1 | -3 |
| 18 | -3 | 1 | 3 | 3 | -1 | -1 | -3 | 3 | 3 | -3 | 3 | -3 |
| 19 | -3 | -3 | 3 | -3 | -1 | 3 | 3 | 3 | -1 | -3 | 1 | -3 |
| 20 | 3 | 1 | 3 | 1 | 3 | -3 | -1 | 1 | 3 | 1 | -1 | -3 |
| 21 | -3 | 3 | 1 | 3 | -3 | 1 | 1 | 1 | 1 | 3 | -3 | 3 |
| 22 | -3 | 3 | 3 | 3 | -1 | -3 | -3 | -1 | -3 | 1 | 3 | -3 |
| 23 | -3 | -1 | -3 | 3 | -3 | -1 | 3 | 3 | 3 | -3 | -1 | -3 |
| 24 | -3 | -1 | 1 | -3 | 1 | 3 | 3 | -1 | -3 | 3 | 3 |
| 25 | -3 | 3 | 1 | -1 | 3 | 3 | -3 | 1 | -1 | 1 | -1 | 1 |
| 26 | -1 | 1 | 3 | -3 | 1 | -1 | 1 | -1 | -1 | -3 | 1 | -1 |
| 27 | -3 | -3 | 3 | 3 | 3 | -3 | -1 | 1 | -3 | 3 | 1 | -3 |
| 28 | 1 | -1 | 3 | 1 | 1 | -1 | -1 | -1 | 1 | 3 | -3 | 1 |
| 29 | -3 | 3 | -3 | 3 | -3 | -3 | 3 | -1 | -1 | 1 | 3 | -3 |

| u | X(0),... X(17) |||||||||||||||||| |
|---|---|---|---|---|---|---|---|---|---|---|---|---|---|---|---|---|---|---|
| 0 | -1 | 3 | -1 | -3 | 3 | 1 | -3 | -1 | 3 | -3 | -1 | -1 | 1 | 1 | 1 | -1 | -1 | -1 |
| 1 | 3 | -3 | 3 | -1 | 1 | 3 | -3 | -1 | -3 | -3 | -1 | -3 | 3 | 1 | -1 | 3 | -3 | 3 |
| 2 | -3 | 3 | 1 | -1 | -1 | 3 | -3 | -1 | 1 | 1 | 1 | 1 | 1 | -1 | 3 | -1 | -3 | -1 |
| 3 | -3 | -3 | 3 | 3 | 3 | 1 | -3 | 1 | 3 | 3 | 1 | -3 | -3 | 3 | -1 | -3 | -1 | 1 |
| 4 | 1 | 1 | -1 | -1 | -3 | -1 | 1 | -3 | -3 | -3 | 1 | -3 | -1 | -1 | 1 | -1 | 3 | 1 |
| 5 | 3 | -3 | 1 | 1 | 3 | -1 | 1 | -1 | -1 | -3 | 1 | 1 | -1 | 3 | 3 | -3 | 3 | -1 |
| 6 | -3 | 3 | -1 | 1 | 3 | 1 | -3 | -1 | 1 | 1 | -3 | 1 | 3 | 3 | -1 | -3 | -3 | -3 |
| 7 | 1 | 1 | -3 | 3 | 3 | 1 | 3 | -3 | 3 | -1 | 1 | 1 | -1 | 1 | -3 | -3 | -1 | 3 |
| 8 | -3 | 1 | -3 | -3 | 1 | -3 | -3 | 3 | 1 | -3 | -1 | -3 | -3 | -3 | -1 | 1 | 1 | 3 |
| 9 | 3 | -1 | 3 | 1 | -3 | -3 | -1 | 1 | -3 | -3 | 3 | 3 | 3 | 1 | 3 | -3 | 3 | -3 |
| 10 | -3 | -3 | -3 | 1 | -3 | 3 | 1 | 1 | 3 | -3 | -3 | 1 | 3 | -1 | 3 | -3 | -3 | 3 |
| 11 | -3 | -3 | 3 | 3 | 3 | -1 | -1 | -3 | -1 | -1 | -1 | 3 | 1 | -3 | -3 | -1 | 3 | -1 |
| 12 | -3 | -1 | -3 | -3 | 1 | 1 | -1 | -3 | -1 | -3 | -1 | -1 | 3 | 3 | -1 | 3 | 1 | -3 |
| 13 | 1 | 1 | -3 | -3 | -3 | -3 | 1 | 3 | -3 | 3 | 3 | 1 | -3 | -1 | 3 | -1 | -3 | 1 |
| 14 | -3 | 3 | -1 | -3 | -1 | -3 | 1 | 1 | -3 | -3 | -1 | -1 | 3 | -3 | 1 | 3 | 1 | 1 |
| 15 | 3 | 1 | -3 | 1 | -3 | 3 | 3 | -1 | -3 | -3 | -1 | -3 | -3 | 3 | -3 | -1 | 1 | 3 |
| 16 | -3 | -1 | -3 | -1 | -3 | 1 | 3 | -3 | -1 | 3 | 3 | 3 | 1 | -1 | -3 | 3 | -1 | -3 |
| 17 | -3 | -1 | 3 | 3 | -1 | 3 | -1 | -3 | -1 | 1 | -1 | -3 | -1 | -1 | -1 | 3 | 3 | 1 |
| 18 | -3 | -1 | -3 | -1 | -1 | 3 | 1 | -3 | -3 | -1 | -3 | -3 | 1 | 1 | 1 | -1 | -1 | -1 |
| 19 | 3 | 3 | 3 | -3 | -1 | -3 | -1 | 3 | -1 | 1 | -1 | -3 | 1 | -3 | -3 | -1 | 3 | 3 |
| 20 | -3 | -1 | 1 | -3 | 1 | 1 | 3 | -3 | -1 | -3 | -1 | 3 | -3 | 3 | -1 | -1 | -1 | -3 |
| 21 | 1 | -3 | -1 | -3 | 3 | 3 | -1 | -3 | 1 | -3 | -3 | -1 | -3 | -1 | 1 | 3 | 3 | 3 |
| 22 | -3 | -3 | 1 | -1 | -1 | 1 | 1 | -3 | -1 | 3 | 3 | 3 | 3 | -1 | 3 | 1 | 3 | 1 |
| 23 | 3 | -1 | -3 | 1 | -3 | -3 | -3 | 3 | 3 | -1 | 1 | -3 | -1 | 3 | 1 | 1 | 3 | 3 |
| 24 | 3 | -1 | -1 | 1 | -3 | -1 | -3 | -1 | -3 | -3 | -1 | -3 | 1 | 1 | 1 | -3 | -3 | 3 |
| 25 | -3 | -3 | 1 | -3 | 3 | 3 | 3 | -1 | 3 | 1 | 1 | -3 | -3 | -3 | 3 | -3 | -1 | -1 |
| 26 | -3 | -1 | -1 | -3 | 1 | -3 | 3 | -1 | -1 | -3 | 3 | 3 | -3 | -1 | 3 | -1 | -1 | -1 |
| 27 | -3 | -3 | 3 | 3 | -3 | 1 | 3 | -1 | -3 | 1 | -1 | -3 | 3 | -3 | -1 | -1 | -1 | 3 |
| 28 | -1 | -3 | 1 | -3 | -3 | -3 | 1 | 1 | 3 | 3 | -3 | 3 | 3 | -3 | -1 | 3 | -3 | 1 |
| 29 | -3 | 3 | 1 | -1 | -1 | -1 | -1 | 1 | -1 | 3 | 3 | -3 | -1 | 1 | 3 | -1 | 3 | -1 |

FIG. 13C

| u | X(0),... X(23) |
|---|---|
| 0 | -1 \| -3 \| 3 \| -1 \| 3 \| 1 \| 3 \| -1 \| 1 \| -3 \| -1 \| -3 \| -1 \| 1 \| 3 \| -3 \| -1 \| -3 \| 3 \| 3 \| 3 \| -3 \| -3 \| -3 |
| 1 | -1 \| -3 \| 3 \| 1 \| 1 \| -3 \| 1 \| -3 \| -3 \| 1 \| -3 \| -1 \| -1 \| 3 \| -3 \| 3 \| 3 \| 3 \| -3 \| 1 \| 3 \| 3 \| -3 \| -3 |
| 2 | -1 \| -3 \| -3 \| 1 \| -1 \| -1 \| -3 \| 1 \| 3 \| -1 \| -3 \| -1 \| -1 \| -3 \| 1 \| 1 \| 3 \| 1 \| -3 \| -1 \| -1 \| 3 \| -3 \| -3 |
| 3 | 1 \| -3 \| 3 \| -1 \| -3 \| -1 \| 3 \| 3 \| 1 \| -1 \| 1 \| 1 \| 3 \| -3 \| -1 \| -3 \| -3 \| -3 \| -1 \| 3 \| -3 \| -1 \| -3 \| -3 |
| 4 | -1 \| 3 \| -3 \| -3 \| -1 \| 3 \| -1 \| -1 \| 1 \| 3 \| 1 \| 3 \| -1 \| -1 \| -3 \| 1 \| 3 \| 1 \| -1 \| -3 \| 1 \| -1 \| -3 \| -3 |
| 5 | -3 \| -1 \| 1 \| -3 \| -3 \| 1 \| 1 \| -3 \| 3 \| -1 \| -1 \| -3 \| 1 \| 3 \| 1 \| -1 \| -3 \| -1 \| -3 \| 1 \| -3 \| -3 \| -3 \| -3 |
| 6 | -3 \| 3 \| 1 \| 3 \| -1 \| 1 \| -3 \| 1 \| -3 \| 1 \| -1 \| -3 \| -1 \| -3 \| -3 \| -3 \| -1 \| -1 \| -1 \| 1 \| 1 \| -3 \| -3 \| -3 |
| 7 | -3 \| 1 \| 3 \| -1 \| 1 \| -1 \| 3 \| -3 \| 3 \| -1 \| -3 \| -1 \| -3 \| 3 \| -1 \| -1 \| -1 \| -3 \| -1 \| -1 \| -3 \| 3 \| 3 \| -3 |
| 8 | -3 \| 1 \| -3 \| 3 \| -1 \| -1 \| -1 \| -3 \| 3 \| 1 \| -1 \| -3 \| -1 \| 1 \| 3 \| -1 \| 1 \| -1 \| 1 \| -3 \| -3 \| -3 \| -3 \| -3 |
| 9 | 1 \| 1 \| -1 \| -3 \| -1 \| 1 \| 1 \| -3 \| 1 \| -1 \| 1 \| -3 \| 3 \| -3 \| -3 \| 3 \| -1 \| -3 \| 1 \| 3 \| -3 \| 1 \| -3 \| -3 |
| 10 | -3 \| -3 \| -3 \| -1 \| 3 \| -3 \| 3 \| 1 \| 3 \| 1 \| -3 \| -1 \| -1 \| -3 \| 1 \| 1 \| 3 \| 1 \| -1 \| -3 \| 3 \| 1 \| 3 \| -3 |
| 11 | -3 \| 3 \| -1 \| 3 \| 1 \| -1 \| -1 \| -1 \| 3 \| 3 \| 1 \| 1 \| 1 \| 3 \| 3 \| 1 \| -3 \| -3 \| -1 \| 1 \| -3 \| 1 \| 3 \| -3 |
| 12 | 3 \| -3 \| 3 \| -1 \| -3 \| 1 \| 3 \| 1 \| -1 \| -1 \| -3 \| -1 \| 3 \| -3 \| 3 \| -1 \| -1 \| 3 \| 3 \| -3 \| -3 \| 3 \| -3 \| -3 |
| 13 | -3 \| 3 \| -1 \| 3 \| -1 \| 3 \| 3 \| 1 \| 1 \| -3 \| 1 \| 3 \| -3 \| 3 \| -3 \| -3 \| -1 \| 1 \| 3 \| -3 \| -1 \| -1 \| -3 \| -3 |
| 14 | -3 \| 1 \| -3 \| -1 \| -1 \| 3 \| 1 \| 3 \| -3 \| 1 \| -1 \| 3 \| 3 \| -1 \| -3 \| 3 \| -3 \| -1 \| -1 \| -3 \| -3 \| -3 \| 3 \| -3 |
| 15 | -3 \| -1 \| -1 \| -3 \| 1 \| -3 \| -3 \| -1 \| -1 \| 3 \| -1 \| 1 \| -1 \| 3 \| 1 \| -3 \| -1 \| 3 \| 1 \| 1 \| -1 \| -1 \| -3 \| -3 |
| 16 | -3 \| -3 \| 1 \| -1 \| 3 \| 3 \| -3 \| -1 \| 1 \| -1 \| -1 \| 1 \| 1 \| -1 \| -1 \| 3 \| -3 \| 1 \| -3 \| 1 \| -1 \| -1 \| -1 \| -3 |
| 17 | 3 \| -1 \| 3 \| -1 \| 1 \| -3 \| 1 \| 1 \| -3 \| -3 \| 3 \| -3 \| -1 \| -1 \| -1 \| -1 \| -1 \| -3 \| -3 \| -1 \| 1 \| 1 \| -3 \| -3 |
| 18 | -3 \| 1 \| -3 \| 1 \| -3 \| -3 \| 1 \| -3 \| 1 \| -3 \| -3 \| -3 \| -3 \| -3 \| 1 \| -3 \| -3 \| 1 \| 1 \| -3 \| 1 \| 1 \| -3 \| -3 |
| 19 | -3 \| -3 \| 3 \| 3 \| 1 \| -1 \| -1 \| -1 \| 1 \| -3 \| -1 \| 1 \| -1 \| 3 \| -3 \| -1 \| -3 \| -1 \| -1 \| 1 \| -3 \| 3 \| -1 \| -3 |
| 20 | -3 \| -3 \| -1 \| -1 \| -1 \| -3 \| 1 \| -1 \| -3 \| -1 \| 3 \| 1 \| -3 \| 3 \| -3 \| 3 \| 3 \| 1 \| -1 \| -1 \| 1 \| -3 \| -3 \| -3 |
| 21 | 3 \| -1 \| 1 \| -1 \| 3 \| -3 \| 1 \| 1 \| 3 \| -1 \| -3 \| 3 \| 1 \| -3 \| 3 \| -1 \| -1 \| -1 \| -1 \| 1 \| -3 \| -3 \| -3 \| -3 |
| 22 | -3 \| 1 \| -3 \| 3 \| -3 \| 1 \| -3 \| 3 \| 1 \| -1 \| -3 \| -1 \| -3 \| -3 \| -3 \| -3 \| 1 \| 3 \| -1 \| 1 \| 3 \| 3 \| 3 \| -3 |
| 23 | -3 \| -1 \| 1 \| -3 \| -1 \| -1 \| 1 \| 1 \| 1 \| 3 \| 3 \| -1 \| 1 \| -1 \| 1 \| -1 \| -1 \| -3 \| -3 \| -3 \| 3 \| 1 \| -1 \| -3 |
| 24 | -3 \| 3 \| -1 \| -3 \| -1 \| -1 \| -1 \| 3 \| -1 \| -1 \| 3 \| -3 \| -1 \| 3 \| -3 \| 3 \| -3 \| -1 \| 3 \| 1 \| 1 \| -1 \| -3 \| -3 |
| 25 | -3 \| 1 \| -1 \| -3 \| -3 \| -1 \| 1 \| -3 \| -1 \| -3 \| 1 \| 1 \| -1 \| 1 \| 1 \| 3 \| 3 \| 3 \| -1 \| 1 \| -1 \| 1 \| -1 \| -3 |
| 26 | -1 \| 3 \| -1 \| -1 \| 3 \| 3 \| -1 \| -1 \| -1 \| 3 \| -1 \| -3 \| 1 \| 3 \| 1 \| 1 \| -3 \| -3 \| -3 \| -1 \| -3 \| -1 \| -3 \| -3 |
| 27 | 3 \| -3 \| -3 \| -1 \| 3 \| 3 \| -3 \| -1 \| 3 \| 1 \| 1 \| 1 \| 3 \| -1 \| 3 \| -3 \| -1 \| 3 \| -1 \| 3 \| 1 \| -1 \| -3 \| -3 |
| 28 | -3 \| 1 \| -3 \| 1 \| -3 \| 1 \| 1 \| 3 \| 1 \| -3 \| -3 \| -1 \| 1 \| 3 \| -1 \| -3 \| 3 \| 1 \| -1 \| -3 \| -3 \| -3 \| -3 \| -3 |
| 29 | 3 \| -3 \| -1 \| 1 \| 3 \| -1 \| -1 \| -3 \| -1 \| 3 \| -1 \| -3 \| -1 \| -3 \| 3 \| -1 \| 3 \| 1 \| 1 \| -3 \| 3 \| -3 \| -3 \| -3 |

FIG. 13D

COMPUTER GENERATED SEQUENCE DESIGN AND HYPOTHESIS MAPPING

CROSS-REFERENCE TO RELATED APPLICATIONS

The present Application for patent claims benefit of and priority to U.S. Provisional Patent Application No. 62/567,213, filed Oct. 2, 2017, which is assigned to the assignee hereof and hereby expressly incorporated by reference herein in its entirety as if fully set forth below and for all applicable purposes.

BACKGROUND

Field of the Disclosure

The present disclosure relates generally to wireless communication systems, and more particularly, to methods and apparatus for generating sequences and mapping cyclic shifts of the sequences to hypotheses for short burst transmissions, for example, in new radio (NR) technologies.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a transmitter. The method generally includes selecting a computer generated sequence (CGS) from a plurality of CGSs, determining, based on different values of uplink control information (UCI) and a first shift index assigned to the transmitter, a shift to apply to the CGS, and transmitting the selected CGS, with the determined shift applied, in a short physical uplink control channel (PUCCH) to indicate the UCI.

Certain aspects provide an apparatus for wireless communication. The apparatus generally includes a processor configured to select a computer generated sequence (CGS) from a plurality of CGSs; to determine, based on different values of uplink control information (UCI) and a first shift index assigned to the apparatus, a shift to apply to the CGS; and to transmit the selected CGS, with the determined shift applied, in a short physical uplink control channel (PUCCH) to indicate the UCI; and a memory coupled with the processor.

Certain aspects provide an apparatus for wireless communication. The apparatus generally includes means for selecting a computer generated sequence (CGS) from a plurality of CGSs; means for determining, based on different values of uplink control information (UCI) and a first shift index assigned to the apparatus, a shift to apply to the CGS; and means for transmitting the selected CGS, with the determined shift applied, in a short physical uplink control channel (PUCCH) to indicate the UCI.

Certain aspects provide a computer-readable medium including instructions. The instructions, when executed by a processor, cause the processor to perform operations generally including selecting a computer generated sequence (CGS) from a plurality of CGSs; determining, based on different values of uplink control information (UCI) and a first shift index assigned to an apparatus including the processor, a shift to apply to the CGS; and transmitting the selected CGS, with the determined shift applied, in a short physical uplink control channel (PUCCH) to indicate the UCI.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 11A-C illustrate exemplary sequences for use in PUCCH, in accordance with aspects of the present disclosure.

FIGS. 13A-D are tables of exemplary values of x(n) for sequences for use in PUCCH, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
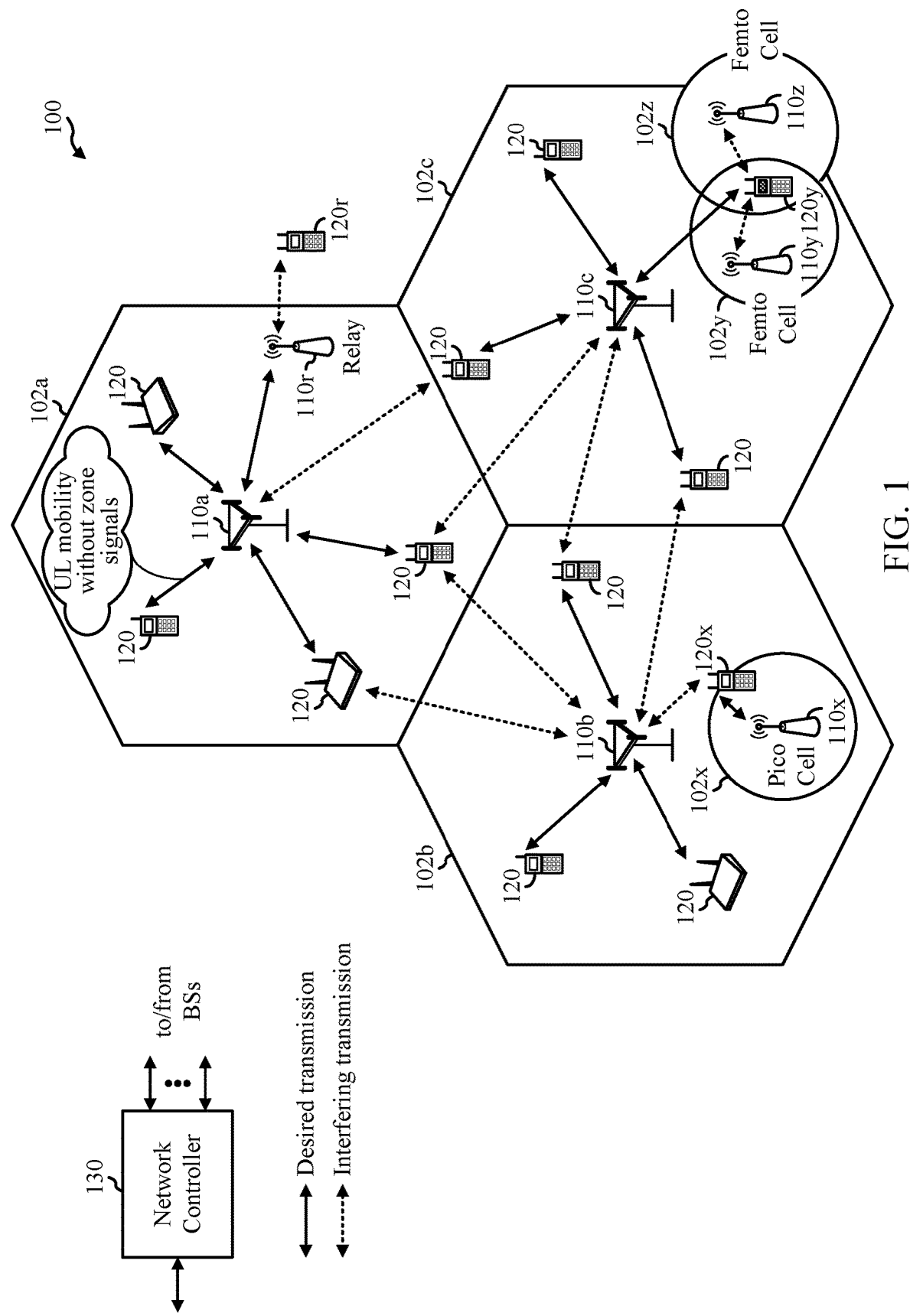
FIG. 1 is a block diagram conceptually illustrating an example telecommunications system, in which aspects of the present disclosure may be performed.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) services targeting wide bandwidth (e.g. 80 MHz and wider) communications, millimeter wave (mmW) services targeting high carrier frequency (e.g. 27 GHz and higher) communications, massive machine-type communications (mMTC) services targeting non-backward compatible machine-type communications (MTC) techniques, and/or mission critical services targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
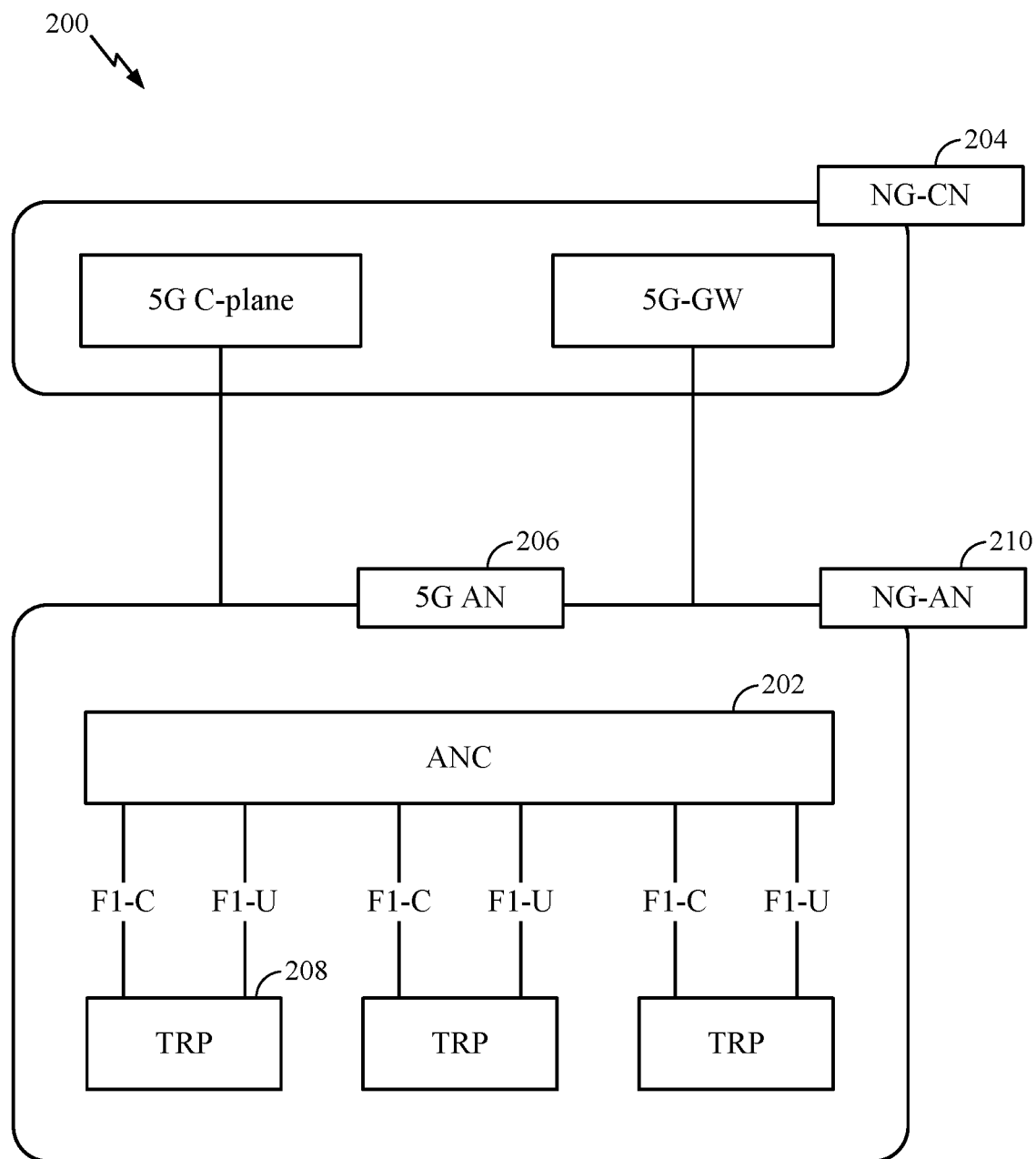
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
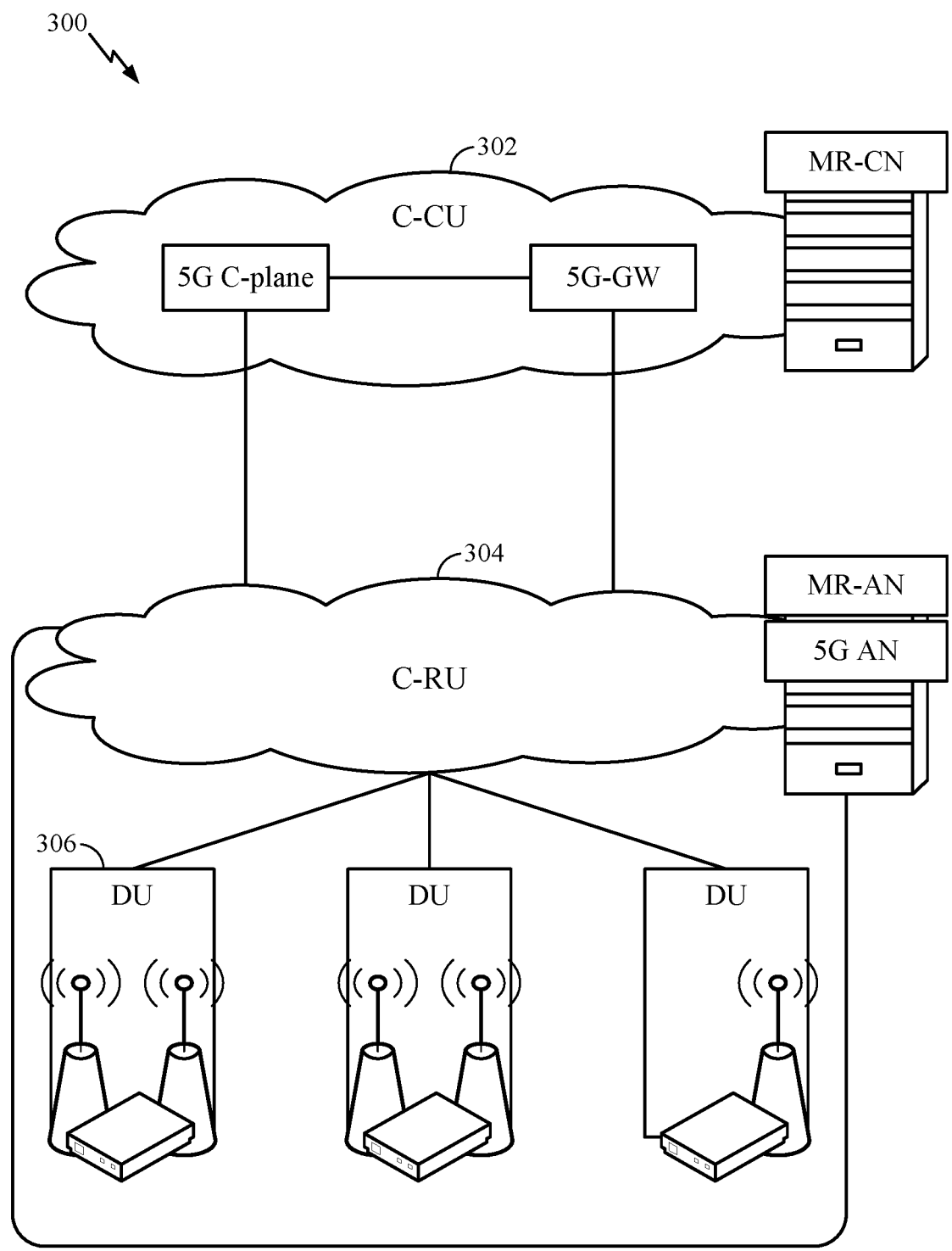
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
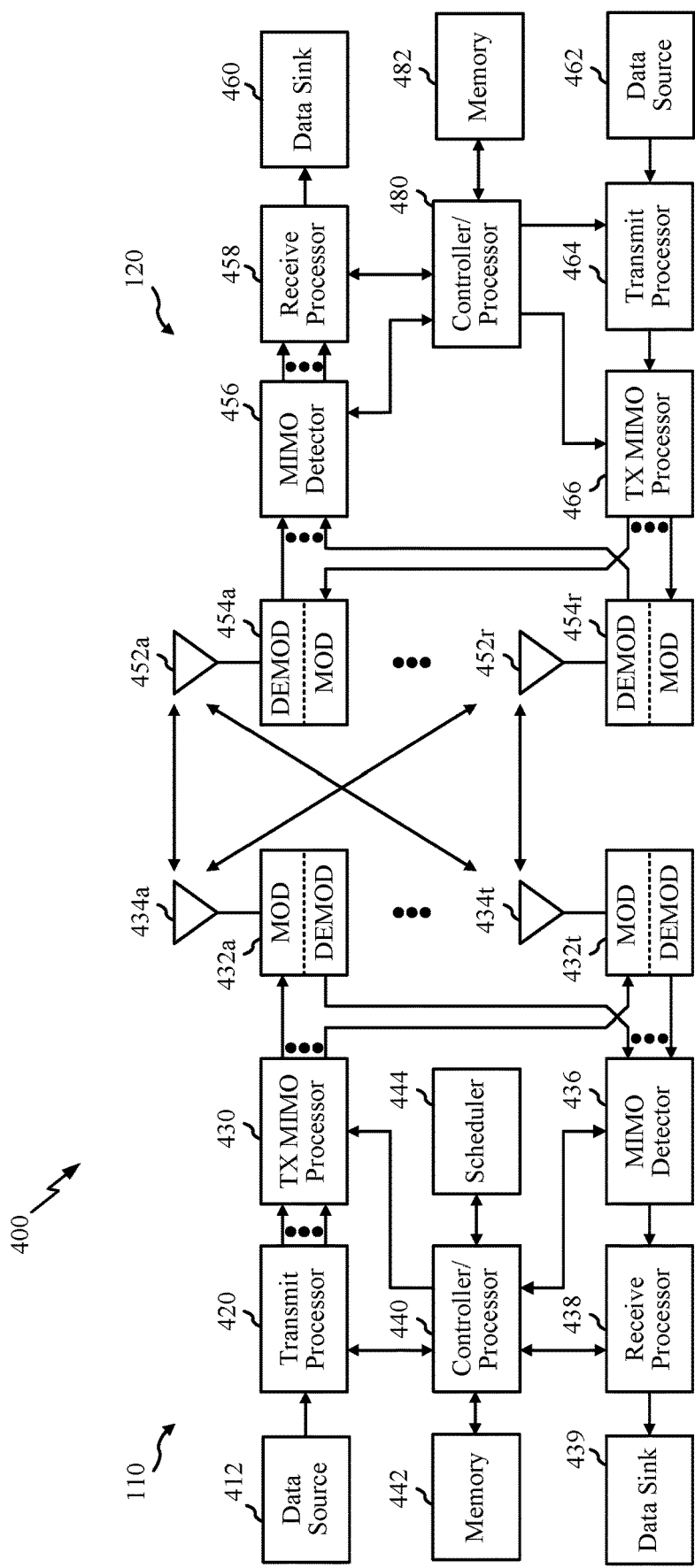
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, processors 466, 458, 464, and/or controller/processor 480 of the UE 120 and/or antennas 434, processors 430, 420, 438, and/or controller/processor 440 of the BS 110 may be used to perform the operations described herein and illustrated with reference to FIGS. 10 and 11.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
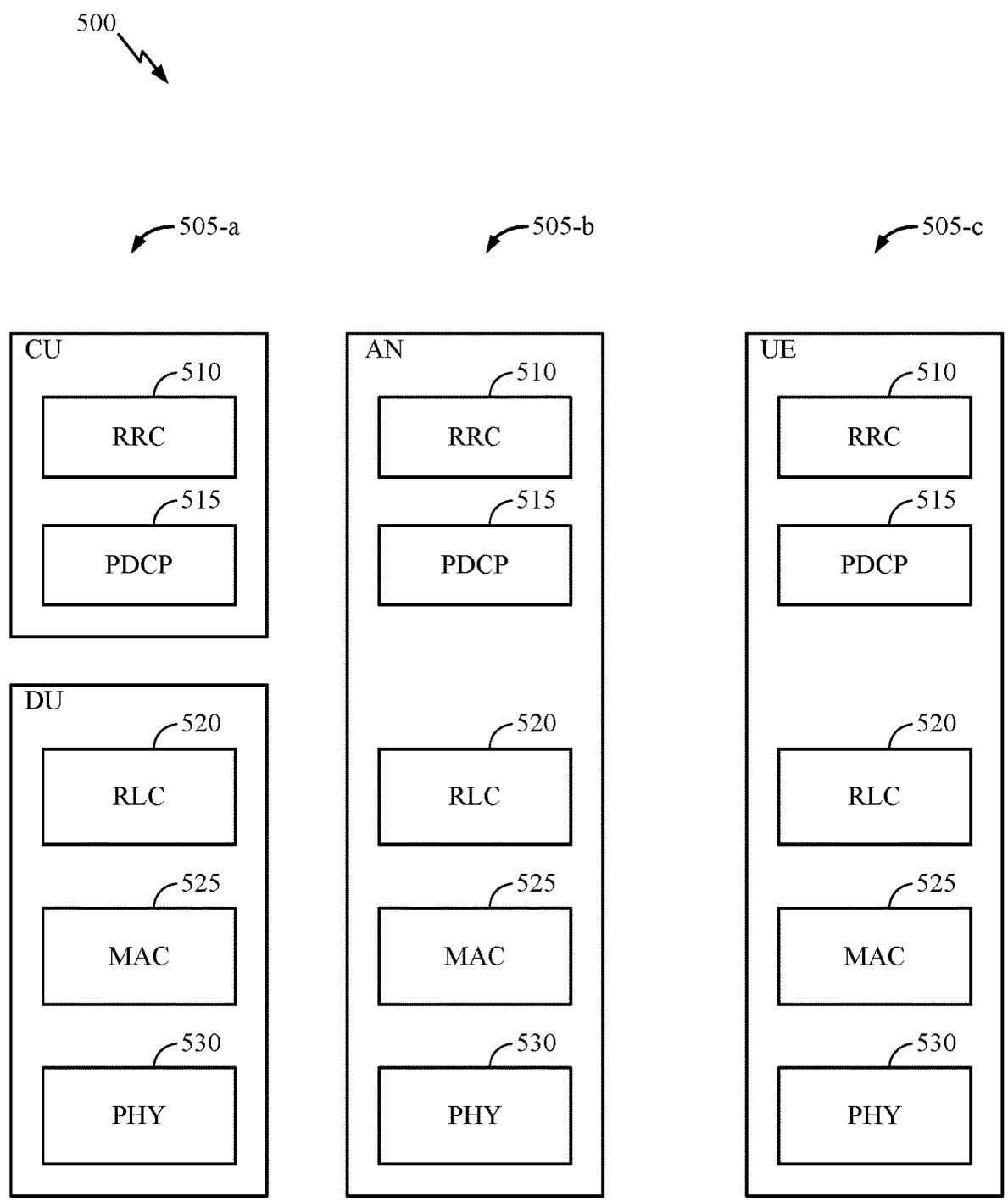
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack 505-*c* (e.g., the RRC layer 510, the PDCP layer 515, the RLC layer 520, the MAC layer 525, and the PHY layer 530).

Figure 6:
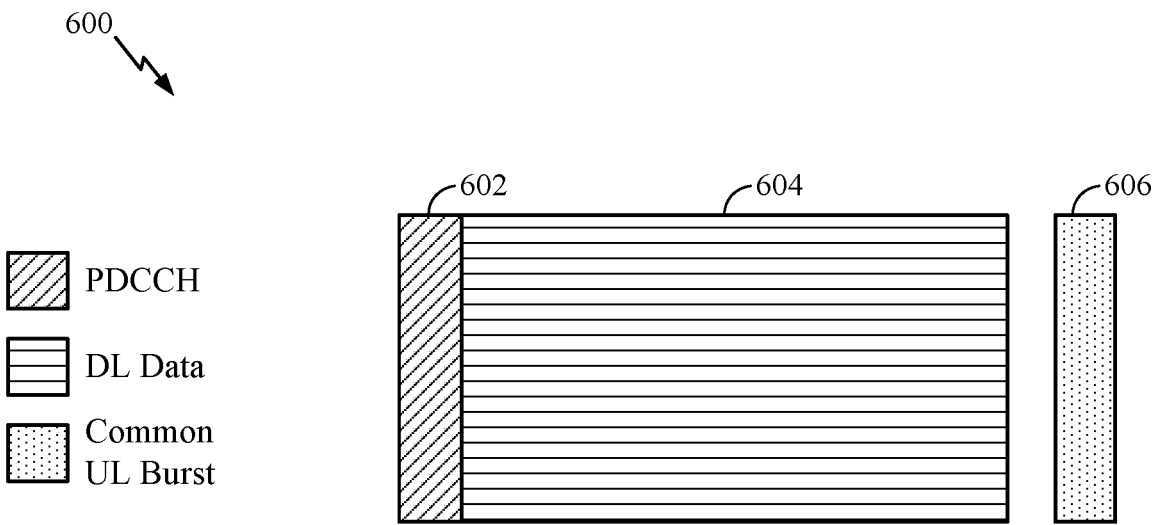
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, an UL short burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include a hybrid automatic retransmission request (HARQ) acknowledgment (ACK) signal, a hybrid automatic retransmission request (HARQ) negative acknowledgment (NAK) signal, channel quality indicator (CQI) information, a scheduling request (SR), and/or various other suitable types of information. Short data, such as TCP ACK information, as well as reference signals, such as sounding reference signals (SRS), may also be conveyed. UL short bursts may have one or more OFDM symbols. The common UL portion 606 may include additional or alternative information, such as information pertaining to random access channel (RACH) procedures, scheduling requests (SRs), and various other suitable types of information. In some cases, such information may be conveyed using shifted sequences transmitted on tones in the UL short burst region. Such shifted sequences have certain properties that may make them suitable for such applications and may be used for common pilot tones.

As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
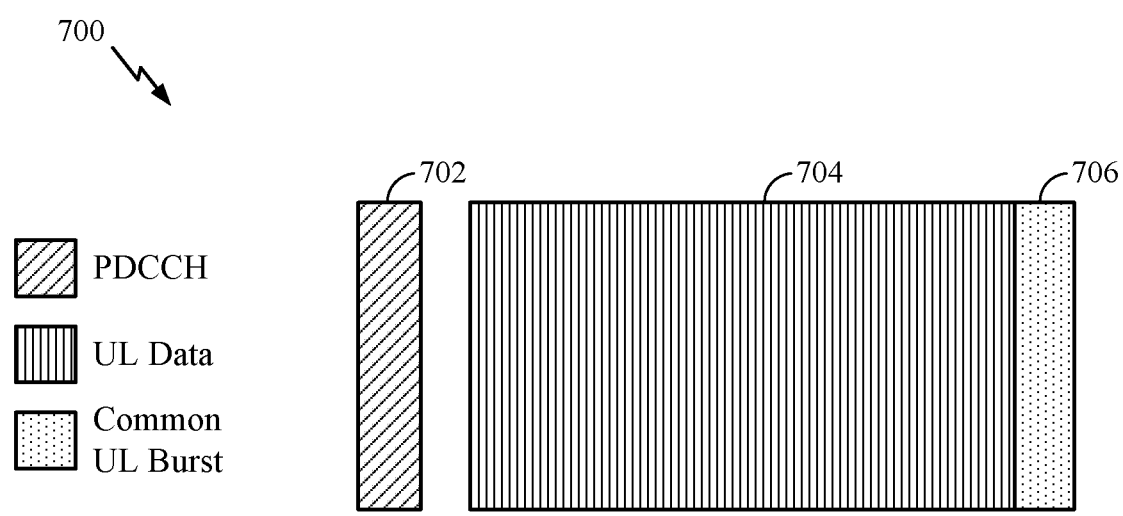
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. As with the common UL portion 606 shown in FIG. 6, the common UL portion 706 may include HARQ-ACK information (e.g., HARQ ACKs and/or HARQ NAKs), a scheduling request, information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

In accordance with one or more aspects of embodiments disclosed herein, various designs are provided for short burst channels (e.g., PUCCH and PUSCH), that allow for multiplexing various signals.

Example Computer Generated Sequence Design and Hypothesis Mapping

According to aspects of the present disclosure, for simultaneous transmission of two bits of hybrid automatic retransmission request acknowledgment (HARQ-ACK) information (i.e., two acknowledgments (ACKs), negative acknowledgments (NAKs), or a combination) and a scheduling request (SR), a UE may transmit a short PUCCH including uplink control information (UCI) of up to two bits. The UCI may include ACKs and/or NACKs of downlink transmissions (e.g., PDSCHs) that a UE has received from a serving cell, as well as an SR, i.e., an indication that the UE has additional information to transmit and needs uplink transmission resources to transmit that additional information.

In aspects of the present disclosure, a UE may transmit a short-PUCCH with UCI of 1 or more bits (e.g., with or without an SR) via selection of a cyclic shift of a sequence. That is, a UE may select a cyclic shift of a sequence (e.g., a computer generated sequence (CGS)) to convey two or more bits of information (e.g., an ACK/NACK and an SR, two ACK/NACKs, or two ACK/NACKs combined with an SR) and transmit the shifted sequence in a short-PUCCH.

According to aspects of the present disclosure, sequences are provided that maximize the shift distance between the shifted sequences for use in transmitting short PUCCHs. In the provided sequences, a base sequence with length N in frequency domain may be represented as $\underline{X}(0, \ldots N-1)$, where $\underline{X}$ may be a low PAPR sequence, e.g., a Chu sequence or a CGS. For one bit of uplink control information (e.g., an ACK/NACK), the sequences may be chosen with a shift distance of N/2 between the sequences. Without losing generality, the two sequences may be represented as $\underline{X1}=\underline{X}$ and $\underline{X2}=\underline{X}*\exp(j*\pi*[0:N-1])$.

Figure 8:
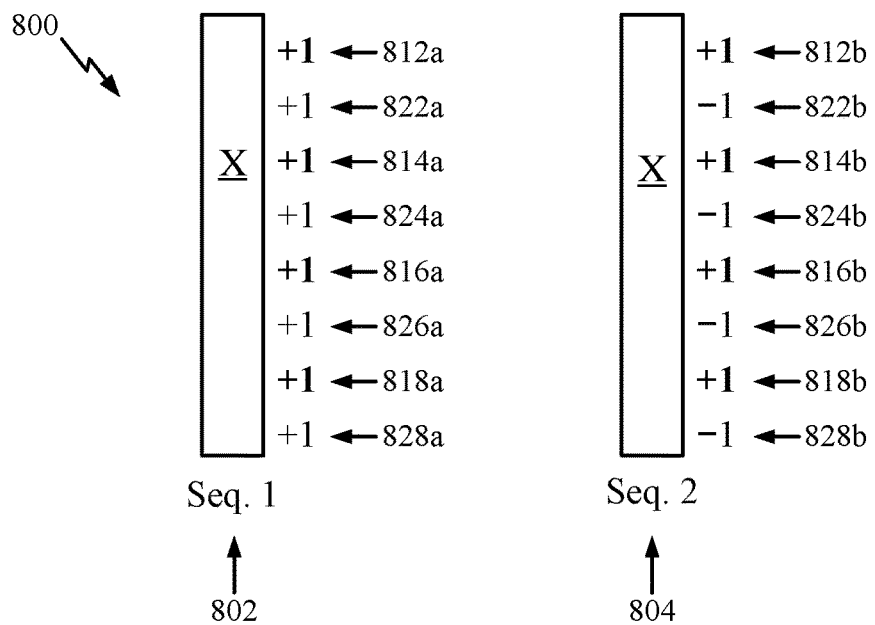
FIG. 8 illustrates example shifted sequences that may be used to convey one bit of information, in accordance with aspects of the present disclosure.

FIG. 8 illustrates an exemplary mapping 800 of exemplary shifted sequences 802 and 804 (i.e., shifted versions of a base sequence) that may be used to convey one bit of information as described above, according to aspects of the present disclosure. As illustrated, the two sequences have exactly the same values 812, 814, 816, and 818 on every other tone, while the other tones 822, 824, 826, and 828 have opposite values in the two sequences. Thus, the exemplary sequences have an equivalent demodulation reference signal (DMRS) structure. Every other tone (i.e., the tones 812, 814, 816, and 818) may be used for channel estimation and noise estimation. In addition, the sequences may have identical demodulation performance as a coherent detection design, with an extra benefit that the transmitted symbols still have low peak-to-average-power-ratio (PAPR) properties. As illustrated, for one bit of ACK/NACK information (i.e., one bit that conveys either an ACK or a NACK, depending on the value of the one bit), a cyclic shift of L/2 in the time domain may lead to sign alternative flipping in the frequency domain, where L is the sequence length.

Similarly to the sequences described above, for transmitting two bits of information, four sequences with a minimum shift distance of L/4 are provided. In the four sequences, every fourth tone can be used as a DMRS tone. The base sequence may be a CGS, a Chu sequence, or any other low PAPR sequence.

Figure 9:
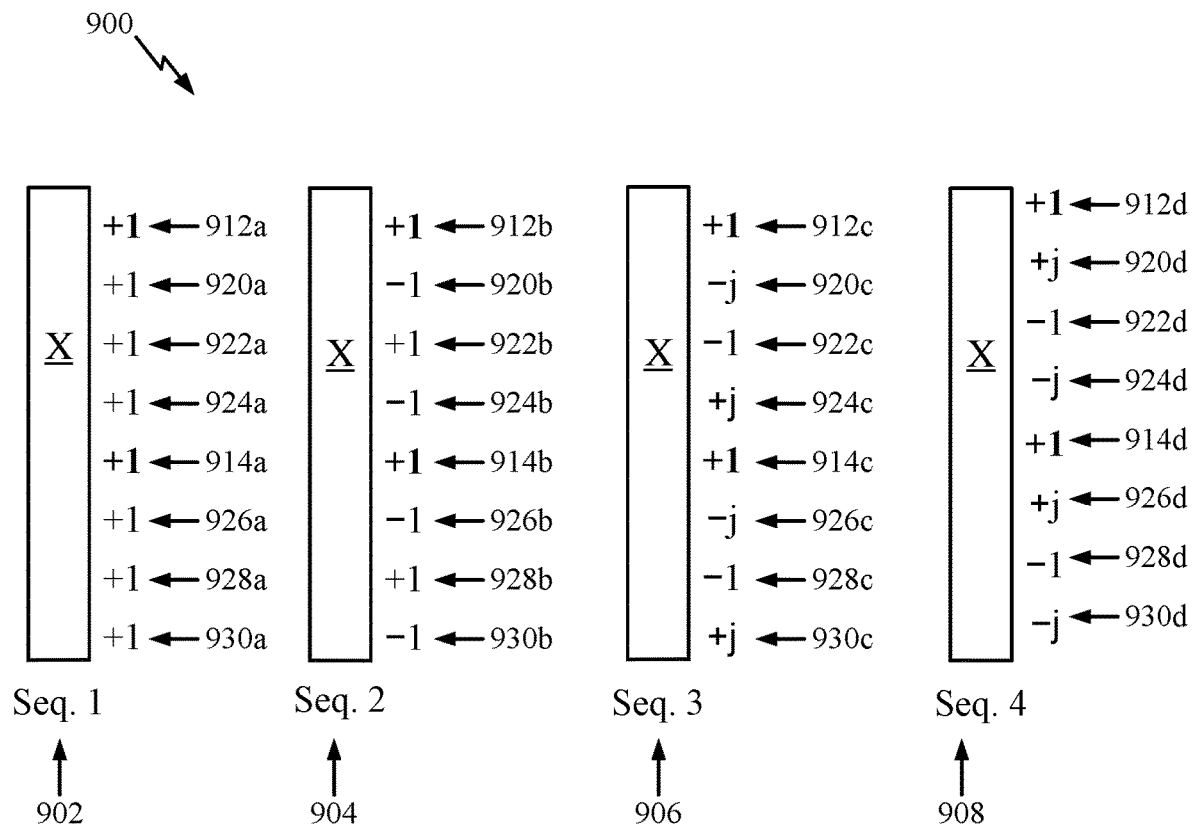
FIG. 9 illustrates example shifted sequences that may be used to convey two bits of information, in accordance with aspects of the present disclosure.

FIG. 9 illustrates an exemplary mapping 900 of exemplary shifted sequences 902, 904, 906, and 908 that may be used to convey two bits of information as described above, according to aspects of the present disclosure. As illustrated, the four sequences have the same values on every fourth tone 912 and 914, while the other tones 920, 922, 924, 926, 928, and 930 have values that are each orthogonal to each other in each of the four sequences. With a minimum shift distance of L/4, every fourth tone (i.e., the tones 912 and 914) can be used as a DMRS tone, e.g., for channel estimation and noise estimation. The base sequence may be CGS sequence, Chu sequence, or other low PAPR sequences. As illustrated, for two bits of ACK/NACK information (i.e., two bits that convey two ACKs, NACKs, or a combination of one ACK and one NACK, depending on the values of the two bits), a cyclic shift of L/4 in the time domain may lead to orthogonal values in the frequency domain, where L is the sequence length.

According to aspects of the present disclosure, properties of the shifted sequences may be exploited to allow for enhanced receiver techniques. For sequence hypotheses having common tones with same (known) values, these tones may, in effect, be used as additional DMRS tones to enhance channel estimation. A receiver implementing such techniques may be considered a hybrid coherent/non-coherent receiver.

While aspects of the present disclosure are described in terms of transmitting one or two bits, the disclosure is not so limited, and aspects of the present disclosure may be used to transmit more than two bits.

According to aspects of the present disclosure, a same set of sequences (e.g., CGSs) may be used in short PUCCHs and long PUCCHs when either is used for transmission of one or more UCI bits on one physical resource block (PRB). That is, one set of sequences may be used to convey bits of UCI in both short PUCCHs and long PUCCHs.

In aspects of the present disclosure, different sets of sequences may be used in short PUCCHs and long PUCCHs when either is used for transmission of one or more UCI bits on one PRB.

According to aspects of the present disclosure, sequences used for conveying information in PUCCHs may be compared on one or more bases. For example, sequences may be compared based on maximum peak-to-average-power-ratio (PAPR), maximum cubic metric (CM), minimum PAPR, minimum CM, mean PAPR, mean CM (e.g., assuming at least 8× oversampling of the sequences by a receiver), and maximum cross-correlation.

In aspects of the present disclosure, maximum cross-correlation between base sequences may be evaluated for new NR sequences by applying all cyclic shift (CS) values of the new NR sequences.

According to aspects of the present disclosure, maximum cross-correlation between the provided base sequences for new NR and LTE (e.g., previously known) sequences may be evaluated by applying all cyclic shift (CS) values to LTE CGS for transmissions sent in one-PRB and two-PRB blocks, and applying all CS values to Zadoff-Chu (ZC) sequences for transmissions sent in blocks larger than two PRBs on up to 100 MHz bandwidth, and considering all partial overlapping between the provided sequences and the LTE sequences.

Other examples for metrics of base sequences can include but are not limited to statistics of cross-correlation, such as mean cross-correlation, maximum cross-correlation, and standard deviation of the cross-correlation of the $95^{th}$ percentile sequences. Both Method 1, using an n-sequence length equal to 384 (12*32), and Method 5, based on R1-163437, can be used to calculate the cross-correlation. In addition, timing misalignment with other values for over-sampling can also be realized with Method 5. Aperiodic cross-correlation for different timing arrivals can also be used as a metric for base sequences.

Modulation type and error vector magnitude (EVM) of received signals using the provided sequences and previously known sequences may also be examples of metrics for comparison of base sequences.

In aspects of the present disclosure, receiver complexity may be used as a performance metric for comparison of base sequences.

According to aspects of the present disclosure, LTE CGS (e.g., CGS used in current LTE communications) are used as a reference for performance comparison with sequences disclosed herein.

In aspects of the present disclosure, using a same set of sequences for short PUCCHs and long PUCCHs may simplify the design (e.g., of the communications protocol) and also save CGS look-up-tables (LUTs). That is, use of the same set of sequences for short PUCCHs and long PUCCHs allows usage of one look-up-table for both short and long PUCCHs conveying a given amount (e.g., two bits) of data, instead of one look-up-table for short PUCCHs conveying that amount of data and a second look-up-table for long PUCCHs conveying that amount of data.

According to aspects of the present disclosure, a same set of sequences can be used for short PUCCHs and long PUCCHs, as long as each of the sequences in the set has a constant modulus in frequency domain. By using a sequence that has a constant modulus in frequency domain, different ACK/NACK/SR hypotheses and users may be separated with cyclic shifts, and therefore, 30 sequences may be enough to support different cells. Otherwise, if different sets of sequences for short PUCCH that are not constant modulus in frequency are used, then it may be desirable to define one sequence for each hypothesis or user per cell.

In aspects of the present disclosure, when a constant phase rotation is applied to all elements of one sequence, the resulting sequence may be considered equivalent to the original sequence, because the elements of the resulting sequence will have exactly the same PAPR and cross-correlation properties as the elements of the original sequence. Furthermore, a cyclic shifted version of a CGS may be treated as an equivalent sequence to the original CGS, because the cyclic shifted version and the original CGS have the same PAPR and same cross-correlation with other sequences. For example, any QPSK based CGS with a cyclic shift equal to N/4*i in time domain (i=0, 1, 2, or 3, where N is the length of the sequence in time domain) will give another QPSK based CGS which may be treated as an equivalent sequence.

According to aspects of the present disclosure, in order to remove duplicate sequence definitions, CGSs may be converted to a same reference symbol for the first element of each sequence, e.g., −3.

In aspects of the present disclosure, a cyclic shifted version of a CGS may be considered equivalent to the original CGS. That is, because cyclic shifting is used to convey bits of data, cyclically shifting a sequence that is a cyclic shifted version of a CGS is equivalent to cyclically shifting the CGS, and conveys the same quantity of data.

Figure 10:
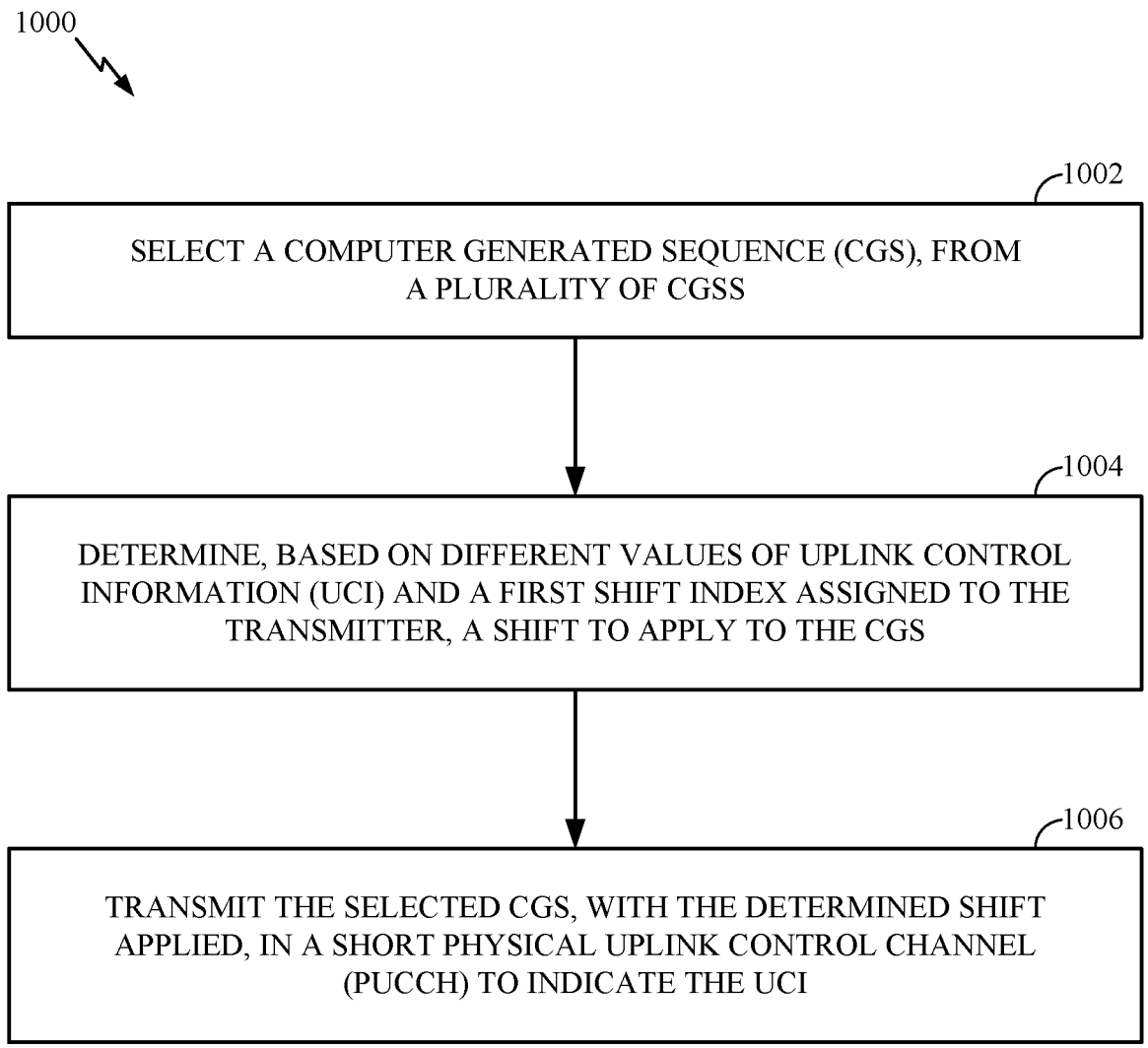
FIG. 10 illustrates example operations for wireless communications, in accordance with aspects of the present disclosure.

FIG. 10 illustrates example operations 1000 for wireless communications by a transmitter, in accordance with aspects of the present disclosure. The operations 1000 may be performed by a UE, such as UE 120, shown in FIG. 1 and FIG. 4. One or more of the components shown in FIG. 4 may be used in performing the operations 1000.

Operations 1000 begin, at block 1002, by the transmitter selecting a computer generated sequence (CGS), from a plurality of CGSs. For example, UE 120, shown in FIG. 1, selects a CGS (e.g., from a look-up-table) consisting of the set of values $\sqrt{2}/2*[(-1-j), (1+j), (-1-j), (-1-j), (-1-j), (-1+j), (-1-j), (1-j), (1+j), (1+j), (1+j), (-1-j)]$ from a plurality of CGSs (e.g., the sets of CGSs described below with reference to FIGS. 11A-C and 12).

At block 1004, operations 1000 continue with the transmitter determining, based on different values of uplink control information (UCI) and a first shift index assigned to the transmitter, a shift to apply to the CGS. Continuing the example from above, the transmitter determines a shift of seven to apply to the CGS, based on a first shift index of one assigned to the transmitter and an assignment of a shift of six to a value of UCI that the transmitter is transmitting.

Operations 1000 continue at block 1006 with the transmitter transmitting the selected CGS, with the determined shift applied, in a short physical uplink control channel (PUCCH) to indicate the UCI. Continuing the example from above, the transmits the CGS selected in block 1002 with the determined shift of seven (that is, the shifted sequence is $\sqrt{2}/2*[(1-j), (1+j), (1+j), (1+j), (-1-j), (-1-j), (1+j), (-1-j), (-1-j), (-1-j), (-1+j), (-1-j)]$ in a short PUCCH to indicate the UCI (e.g., to convey the UCI to a base station).

According to aspects of the present disclosure, the PAPR of LTE CGS sequences may not be optimized. A computer search with QPSK sequences for 1 RB may obtain a set of CGS sequences, as shown herein with reference to FIGS. 11A-C and 12.

In aspects of the present disclosure, elements $r_{u,v}(n)$ of a CGS may be calculated according to the formula:

$r(n) = u * \exp(j * \pi * x(n)/4)$, where:

$0 \leq n \leq N-1$ and n is an integer,

N is the size of the sequence and $N \in \{6, 12, 18, 24\}$, u is a constant, and x(n) (also referred to as φ(n)) is a value looked up from a table.

Sequences calculated in this manner may be represented by tables of the values of x(n).

FIGS. 11A and 11B illustrate a table 1100 of exemplary values of x(n) for sequences for use in PUCCH, according to aspects of the present disclosure. In the table, each row is for a different sequence, a first column 1102 is an index to the sequence, a second column 1104 shows the formula for calculation of the terms in the header row and the values of x(n) for each sequence in the other rows, a third column 1106 shows CM in decibels for each sequence, and a fourth column 1108 shows PAPR in decibels for each sequence.

The tables below summarize the PAPR and cross-correlation comparisons of the provided CGSs with previously known LTE sequences. For mean PAPR, the provided sequences outperform LTE sequences by 1.6 dB. For maximum PAPR, the provided sequences outperform LTE sequences by 1 dB. The cross-correlation of the provided sequences is also better than the cross-correlation of LTE sequences.

TABLE 1

PAPR comparison between provided CGSs and LTE sequences

|  | Provided CGSs | LTE sequences |
| --- | --- | --- |
| Mean PAPR | 2.6025 | 3.2070 |
| Max. PAPR | 2.9787 | 4.0914 |
| Min. PAPR | 2.3349 | 2.3349 |

TABLE 2

CM comparison between provided CGSs and LTE sequences

|  | Provided CGSs | LTE sequences |
| --- | --- | --- |
| Mean CM | 0.5183 | 0.5992 |
| Max. CM | 0.8778 | 0.9248 |
| Min. CM | 0.2051 | 0.1945 |

TABLE 3

Cross correlation comparison between provided CGSs and LTE sequences

|  | Provided CGSs | LTE sequences |
| --- | --- | --- |
| Mean Corr. | 0.242 | 0.243 |
| Corr. 95th percentile: | 0.496 | 0.496 |
| Max. Corr. | 0.7 | 0.8 |

FIG. 11C is a table 1150 showing additional sequences, according to aspects of the present disclosure. As with the sequences illustrated in FIGS. 11A-B, the sequences are represented by values of x(n) to be used in the equation $r(n) = u * \exp(j * \pi * x(n)/4)$. Thus, the values in the row 1152 are representative of a sequence of the form $\sqrt{2}/2*[(-1-j), (1-j), (1-j), (-1+j), (1+j), (1-j), (1-j), (1+j), (-1-j), (1-j), (-1-j), (-1-j)]$.

Figure 12A:
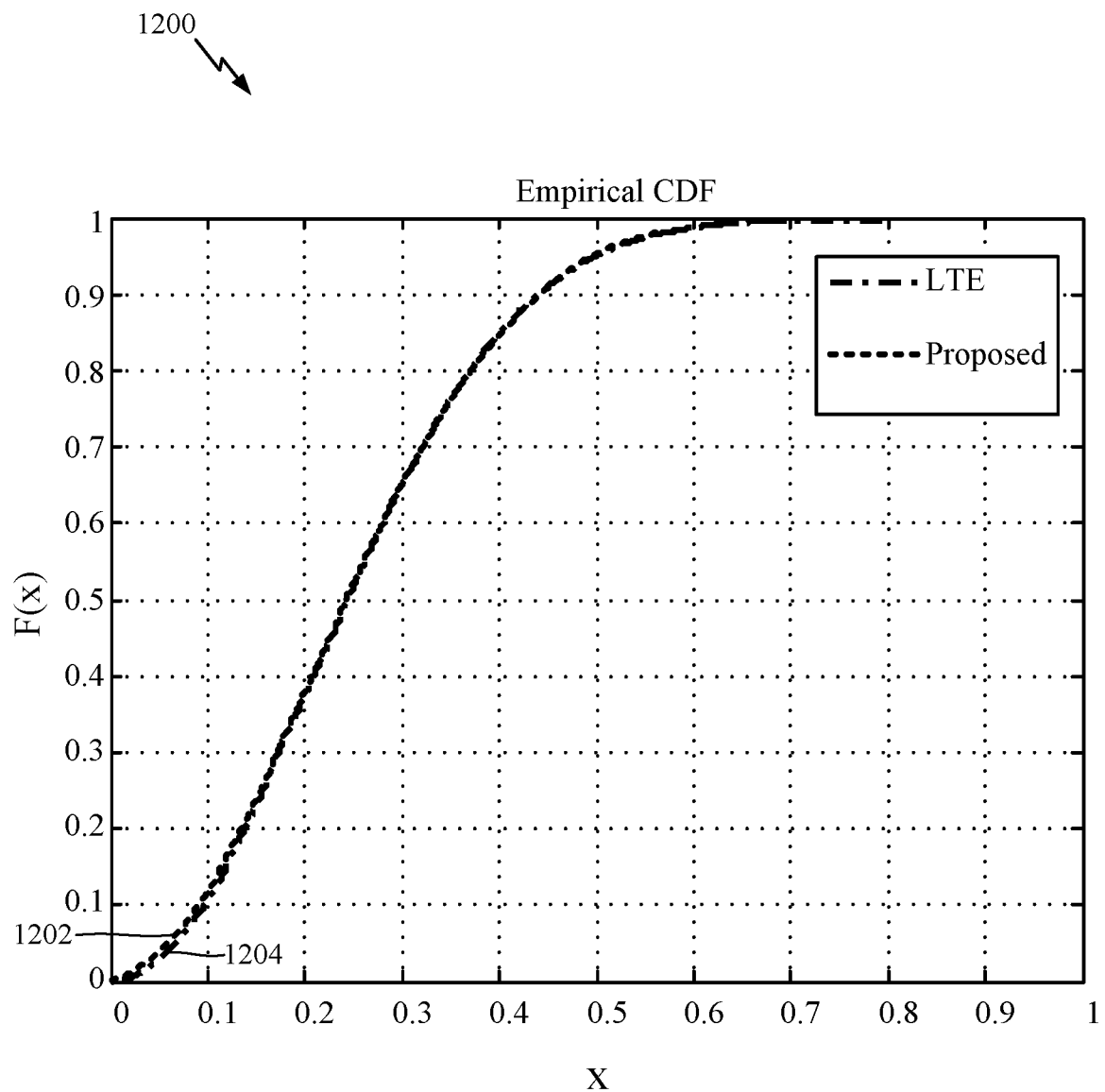
FIGS. 12A-C are exemplary curves illustrating the performance of the disclosed sequences and previously known sequences, in accordance with aspects of the present disclosure.
Figure 12B:
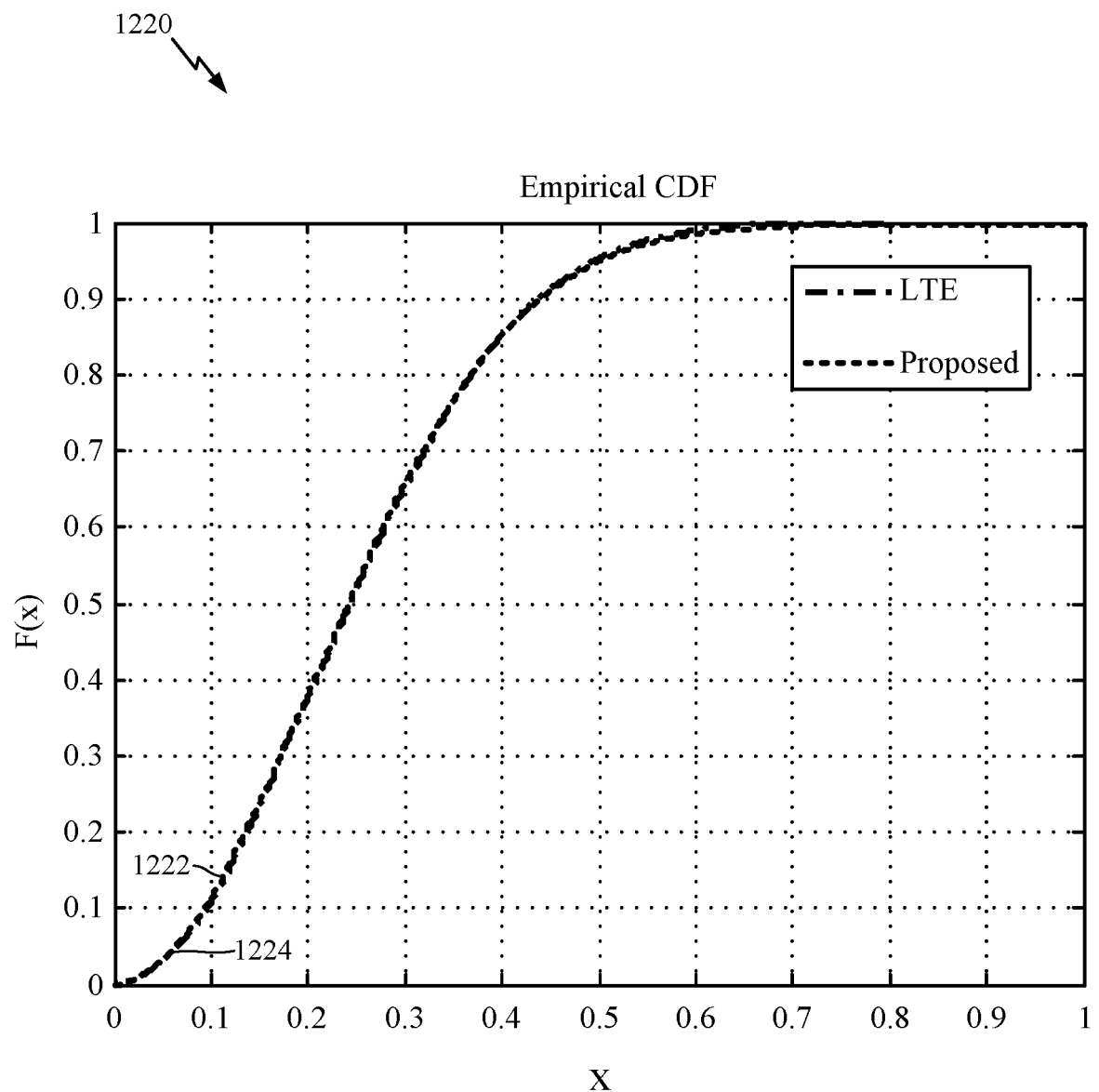
Figure 12C:
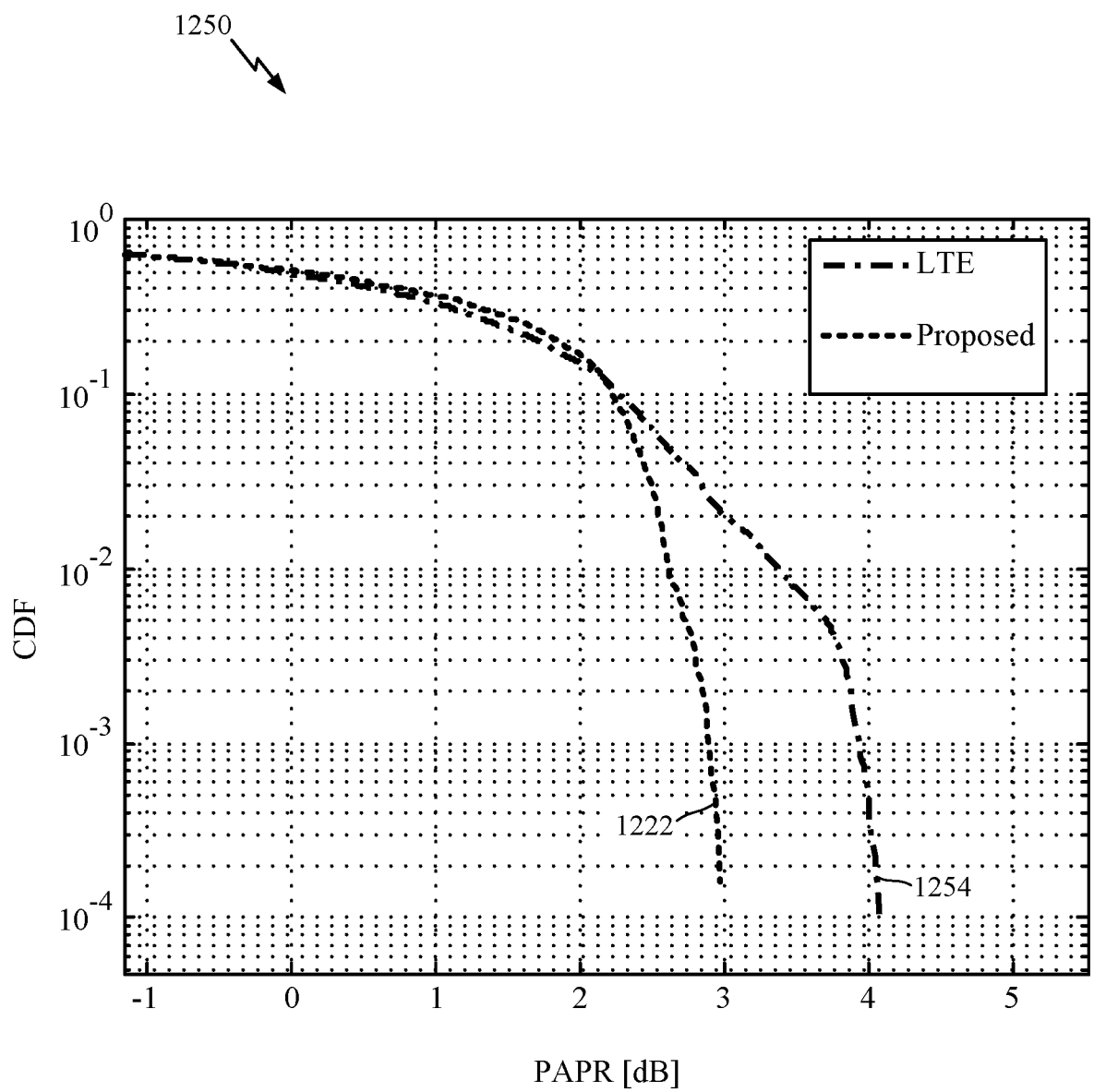

FIGS. 12A-C are exemplary graphs of curves illustrating the performance of the provided sequences and previously known sequences, according to aspects of the present disclosure.

FIG. 12A is a graph 1200 showing curves illustrating self-cross-correlation of the provided sequences and LTE sequences mentioned. The curve 1202 shows a cumulative distribution function (CDF) of the self-cross-correlation of the provided sequences, while the curve 1204 shows a CDF of the self-cross-correlation of previously known LTE sequences. As illustrated, the self-cross-correlation of the provided sequences are nearly identical to the self-cross-correlation of previously known LTE sequences.

FIG. 12B is a graph 1220 showing curves illustrating cross-correlation of LTE sequences with the provided sequences. The curve 1222 shows a CDF of the cross-correlation of a provided sequence of length twelve (i.e., N=12) with the previously known LTE sequence of length twelve, while the curve 1224 shows a CDF of the cross-correlation of the LTE sequence with itself. As illustrated, the cross-correlation of the provided sequence with the LTE sequence is a close approximation of the cross-correlation of the LTE sequence with itself.

FIG. 12C is a graph 1250 showing curves illustrating relationships between PAPR and bit error rate (BER) of the disclosed sequences and the previously known LTE sequences. The curve 1252 shows a CDF of bit error rate (BER) experienced by a receiver receiving the disclosed sequence when transmitted by a transmitter transmitting a provided sequence and other signals at various PAPR to the other signals. The curve 1254 shows a CDF of BER experienced by a receiver receiving an LTE sequence when transmitted by a transmitter transmitting the sequence and other signals at various PAPR to the other signals. As illustrated, the provided sequences are received with lower bit error rates at lower PAPR than the LTE sequences.

FIGS. 13A-D are tables 1300, 1320, 1340, and 1360 of exemplary values of x(n) for sequences for use in PUCCH, according to aspects of the present disclosure. In the tables, each row is for a different sequence. As above in FIGS. 11A-C, the sequences are represented by values of x(n) to be used in the equation $r(n) = u * \exp(j * \pi * x(n)/4)$ FIG. 13A is a table 1300 of exemplary values of x(n) for sequences having a length of six for use in PUCCH, according to aspects of the present disclosure. In the table, a first column 1302 is an index to the table of sequences, and a second column 1304 shows the values of x(n) for each of the sequences.

FIG. 13B is a table 1320 of exemplary values of x(n) for sequences having a length of twelve for use in PUCCH, according to aspects of the present disclosure. In the table, a first column 1322 is an index to the table of sequences, and a second column 1324 shows the values of x(n) for each of the sequences.

FIG. 13C is a table 1340 of exemplary values of x(n) for sequences having a length of eighteen for use in PUCCH, according to aspects of the present disclosure. In the table, a first column 1342 is an index to the table of sequences, and a second column 1344 shows the values of x(n) for each of the sequences.

FIG. 13D is a table 1360 of exemplary values of x(n) for sequences having a length of twenty-four for use in PUCCH, according to aspects of the present disclosure. In the table, a first column 1362 is an index to the table of sequences, and a second column 1364 shows the values of x(n) for each of the sequences.

According to aspects of the present disclosure, the use of sequences to transmit ACK/NACK bits may be generalized to other numbers of bits. If $N_s$ is the sequence length and $N_b$ is the number of bits (e.g., ACK/NACK bits) to be transmitted, then a minimum shift distance, $d_s$, may be calculated as $$d_s = \frac{N_s}{2^{N_b}}.$$

When compared with other sequence based designs, the disclosed techniques have the benefits of maximizing the minimum shift distance between hypotheses as well as the ability of coherent detection.

With sequence based design as disclosed herein, up to 6 UEs may be multiplexed in one period, with each UE transmitting 1 bit of UCI, or 3 UEs may be multiplexed, with each UE transmitting 2 bits of UCI. When UEs are multiplexed together, it may be desirable to randomize the mapping from ACK/NACK hypothesis to shifts so that one hypothesis doesn't face consistent interference from the same hypothesis from another UE.

According to aspects of the present disclosure, randomization of the mapping from ACK/NACK hypothesis to shifts may be done by combining two techniques. A first technique may include different shift scheduling from slot to slot by a BS (e.g., an eNB, a gNB). For example, a UE may be assigned (e.g., by a BS serving a cell to which the UE is connected) with shifts 0, 3, 6, and 9 in one slot, and then 1, 4, 7, and 10 in another slot. A second technique for the randomization is by randomizing the relative mapping orders of the ACK/NACK hypothesis within the assigned shifts. The mapping order may be determined by a predetermined pattern based on the one of more of the parameters including first shift index, the slot index, and the symbol index.

In aspects of the present disclosure, a technique for randomizing the relative mapping orders may be determined as in the following example. Let $n_{cs}^0(n_s, 1)$ be the first cyclic shift index assigned by eNB to the UE for the symbol number I and the slot number $n_s$. Then the UE may derive the $i^{th}$ cyclic shift indices according to the flowing formula:

$$n_{cs}^i(n_s, l) = \left( n_{cs}^0(n_s, l) + i^* \frac{N_s}{2^{N_b}} \right) \% \ N_s,$$

where
i=1, . . . , $2^{N_b}$–1,
$n_{cs}^0(n_s, 1)$ is in the range of 0 to $$\frac{N_s}{2^{N_b}} - 1,$$

and
% represents the modulo (mod) operation.

The total assigned shifts are $2^{N_b}$. For example, with 2 bits, if $n_{cs}^0(n_s,1)$=1, the assigned shifts are {1, 4, 7, 10}.

According to aspects of the present disclosure, for one bit of ACK/NACK information, the NACK hypothesis (0) may be mapped to the $j_0^{th}$ cyclic shifts $n_{cs}^{j_0}(n_s,1)$ randomly, where $j_0(n_s,1)$ is determined by $$j_0(n_s,l)=c(n_{cs}^0(n_s,l)N_{symb}^{UL\_short} \cdot n_s + n_{cs}^0(n_s,l)l+n_c^0(n_s,l))$$

where the pseudo-random sequence c(i) is defined by clause 7.2 in 3GPP TS36.211 ("Evolved Universal Terrestrial Radio Access (E-UTRA); Physical Channels and Modulation," which is publicly available). The pseudo-random sequence generator may be initialized with $c_{init}=n_{ID}^{sPUCCH}$, where $n_{ID}^{sPUCCH}$ is either configured by higher layer, set as cell ID, or is a function of UE RNTI, and $N_{symb}^{UL\_short}$ is the number of symbols in a short PUCCH region (i.e., a region of time and frequency resources). The ACK hypothesis (1) may be mapped to the other shift index that is $j_1$th cyclic shifts $n_{cs}^{j_1}(n_s,1)$, where $j_1(n_s,1)$ is determined by $$j_1(n_s,l)=(j_0(n_s,l)+1)\%2$$

In aspects of the present disclosure, for two bits of ACK/NACK information, the NACK/NACK hypothesis (00) may be mapped to the $j_{00}$th cyclic shifts $n_{cs}^{j_{00}}(n_s,1)$, where $j_{00}(n_s,1)$ is determined by $$j_{00}(n_s,l)=\Sigma_{k=0}^1(2n_{cs}^0(n_s,l)N_{symb}^{UL\_short} \cdot n_s + 2n_{cs}^0(n_s,l)l+2n_{cs}^0(n_s,l)+k) \cdot 2^k$$

where the pseudo-random sequence c(i) is defined by clause 7.2 in TS36.211. The pseudo-random sequence generator may be initialized with $c_{init}=n_{ID}^{sPUCCH}$, where $n_{ID}^{sPUCCH}$ is either configured by higher layer, set as a cell ID, or is a function of UE RNTI. The ACK ACK hypothesis (11) may be mapped to a shift index with largest shift distance to NACK NACK hypothesis, that is $j_{11}$th cyclic shifts $n_{cs}^{j_{11}}(n_s, 1)$, where $j_{11}(n_s,1)$ is determined by $$j_{11}(n_s,l)=(j_{00}(n_s,l)+2)\%4$$

The NACK ACK hypothesis (01) may be mapped to one of the remaining two shifts $j_{01}$ th cyclic shifts $n_{cs}^{j_{01}}(n_s,1)$, where $j_{01}(n_s,1)$ is determined by $$j_{01}(n_s,l)=(j_{00}(n_s,l)+1+c(2n_{cs}^0(n_s,l) N_{symb}^{UL\_short} \cdot n_s+2n_{cs}^0(n_s,l)l+2n_{cs}^0(n_s,l)+1)\%4$$

The ACK NACK hypothesis (10) may be mapped to the shift index with largest shift distance to NACK ACK hypothesis, that is $j_{10}$th cyclic shifts $n_{cs}^{j_{10}}(n_s,1)$, where $j_{10}(n_s,1)$ is determined by $$j_{10}(n_s,l)=(j_{01}(n_s,l)+2)\%4$$

One example is illustrated in the following table, where 1 denotes an ACK and 0 denotes a NACK. As can be seen from the example, the same shift is mapped to a different ACK/NACK hypothesis in each of the different slots. Therefore, its neighbor hypothesis will also be different. The interference faced by a UE for transmission of a given hypothesis in different slots may be randomized.

|  | Slot 0 | | | | Slot 1 | | | | Slot 2 | | | | ... |
|---|---|---|---|---|---|---|---|---|---|---|---|---|---|
| | Hypotheses-> | | | | | | | | | | | | |
| First shift | 00 | 01 | 10 | 11 | 00 | 01 | 10 | 11 | 00 | 01 | 10 | 11 | ... |
| 0 | 6 | 9 | 0 | 3 | 0 | 9 | 6 | 3 | 0 | 3 | 6 | 9 | ... |
| 1 | 7 | 10 | 1 | 4 | 1 | 10 | 7 | 4 | 4 | 7 | 10 | 1 | ... |
| 2 | 11 | 2 | 5 | 8 | 2 | 11 | 8 | 5 | 5 | 8 | 11 | 1 | ... |

According to aspects of the present disclosure, a similar concept may be applied to 2-symbol short PUCCHs with up to 2 bits as well. In that case, different short PUCCH symbols will use different mapping due to the variation of symbol index 1 in the formula. Furthermore, the first shift index in different symbols or different slots may be derived from the first shift index assigned in the first symbol or the first slot. That is, a shift hopping among symbols or slots may be used on top of the random mapping between shift index and ACK/NACK hypothesis. In some scenarios, all the shift indices used by the UE may be assigned by a BS (e.g., an eNB or a gNB), rather than derived by the UE from the first shift index.

According to aspects of the present disclosure, a similar concept may be applied to 1 or 2-symbol short PUCCHs with more than 3 bits as well. For more than 2 bits of UCI, the shift index may be derived by the UE based the first shift index, or it may be assigned by the eNB. The mapping of from the hypothesis to the shift index may also be randomized based on a pseudo-random sequence as a function of first shift index, the symbol index, and the slot index.

Example PUCCH Resource Allocation Options

According to aspects of the present disclosure, different control resource sets (CORESETs) may use different PUCCH resource sets. That is, a UE configured to use different CORESETs for sending control information may use different PUCCH resource sets associated with the different CORESETs, when transmitting PUCCHs as described herein.

In aspects of the present disclosure, a PUCCH with up to 2 bits of UCI and a PUCCH with more than 3 bits of UCI in either short or long duration PUCCHs use different sets. Thus, according to aspects of the present disclosure, a UE may be configured with 4 resource sets for: short PUCCHs conveying 1 or 2 bits of UCI, short PUCCHs conveying 3 or more bits of UCI, long PUCCHs conveying 1 or 2 bits of UCI, and long PUCCHs conveying 3 or more bits of UCI.

According to aspects of the present disclosure, default values of the starting symbol and ending symbol for long PUCCH may derived based on information received in system information blocks (SIBs).

In aspects of the present disclosure, default values of the starting symbol and ending symbol (e.g., a number of symbols) may be semi-statically configured for a UE via RRC signaling.

According to aspects of the present disclosure, default starting and/or ending symbols (e.g., as mentioned above) for both short PUCCH and long PUCCH may be dynamically overridden in downlink control information (DCI).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a transmitter, comprising:
   selecting a computer generated sequence (CGS) from a plurality of CGSs, wherein selecting the CGS comprises:
      obtaining a sequence index, u, of the CGS; and
      looking up a sequence of exponent values, x(n), from a table, based on u, wherein the table comprises at least one of the sequences:

| x(0), . . . x(11) | | | | | | | | | | | |
|---|---|---|---|---|---|---|---|---|---|---|---|
| −3 | 1 | 3 | −1 | −1 | −3 | −3 | −1 | −1 | 3 | 1 | −3, |

| x(0), . . . x(11) | | | | | | | | | | | |
|---|---|---|---|---|---|---|---|---|---|---|---|
| −3 | 1 | −1 | −1 | 3 | 3 | −3 | −1 | −1 | −3 | −1 | −3, |

| x(0), . . . x(11) | | | | | | | | | | | |
|---|---|---|---|---|---|---|---|---|---|---|---|
| −3 | −1 | −3 | −1 | −1 | −3 | 3 | 3 | −1 | −1 | 1 | −3, |

| x(0), . . . x(11) | | | | | | | | | | | |
|---|---|---|---|---|---|---|---|---|---|---|---|
| −3 | 3 | −3 | 3 | 3 | −3 | −1 | −1 | 3 | 3 | 1 | 3 |

| x(0), . . . x(11) | | | | | | | | | | | |
|---|---|---|---|---|---|---|---|---|---|---|---|
| −3 | 1 | 3 | 3 | −1 | −1 | −3 | 3 | 3 | −3 | 3 | −3, or |

| x(0), . . . x(11) | | | | | | | | | | | |
|---|---|---|---|---|---|---|---|---|---|---|---|
| −3 | 3 | 3 | 3 | −1 | −3 | −3 | −1 | −3 | 1 | 3 | −3; | determining, based on different values of uplink control information (UCI) and a first shift index assigned to the transmitter, a shift to apply to the CGS; and
   transmitting the selected CGS, with the determined shift applied, in a short physical uplink control channel (PUCCH) to indicate the UCI.

2. The method of claim 1, wherein the UCI comprises at least one scheduling request (SR) bit or at least one acknowledgment (ACK) bit, or one combination of a SR bit and at least one ACK bit.

3. The method of claim 1, wherein the UCI comprises more than two bits of UCI.

4. The method of claim 1, wherein:
   the UCI comprises one or more acknowledgment or negative acknowledgment (ACK/NACK) bits; and
   a mapping randomizes a selection of shifts to different values of the ACK/NACK bits, based on the first shift index.

5. The method of claim 4, wherein the mapping randomizes the selection of shifts to different values of the ACK/NACK bits based also on at least one of a slot index or a symbol index of the short PUCCH.

6. The method of claim 1, wherein the CGS comprises a sequence of values calculated using the sequence of exponent values.

7. An apparatus for wireless communications, comprising:
   a processor configured to:
   select a computer generated sequence (CGS) from a plurality of CGSs by:
      obtaining a sequence index, u, of the CGS; and
      looking up a sequence of exponent values, x(n), from a table, based on u, wherein the table comprises at least one of the sequences:

| x(0), . . . x(11) | | | | | | | | | | | |
|---|---|---|---|---|---|---|---|---|---|---|---|
| −3 | 1 | 3 | −1 | −1 | −3 | −3 | −1 | −1 | 3 | 1 | −3, |

| x(0), . . . x(11) | | | | | | | | | | | |
|---|---|---|---|---|---|---|---|---|---|---|---|
| −3 | 1 | −1 | −1 | 3 | 3 | −3 | −1 | −1 | −3 | −1 | −3, |

| x(0), . . . x(11) | | | | | | | | | | | |
|---|---|---|---|---|---|---|---|---|---|---|---|
| −3 | −1 | −3 | −1 | −1 | −3 | 3 | 3 | −1 | −1 | 1 | −3, |

| x(0), . . . x(11) | | | | | | | | | | | |
|---|---|---|---|---|---|---|---|---|---|---|---|
| −3 | 3 | −3 | 3 | 3 | −3 | −1 | −1 | 3 | 3 | 1 | 3 |

| x(0), . . . x(11) | | | | | | | | | | | |
|---|---|---|---|---|---|---|---|---|---|---|---|
| −3 | 1 | 3 | 3 | −1 | −1 | −3 | 3 | 3 | −3 | 3 | −3, or |

| x(0), . . . x(11) | | | | | | | | | | | |
|---|---|---|---|---|---|---|---|---|---|---|---|
| −3 | 3 | 3 | 3 | −1 | −3 | −3 | −1 | −3 | 1 | 3 | −3; | determine, based on different values of uplink control information (UCI) and a first shift index assigned to the apparatus, a shift to apply to the CGS; and
   transmit the selected CGS, with the determined shift applied, in a short physical uplink control channel (PUCCH) to indicate the UCI; and
   a memory coupled with the processor.

8. The apparatus of claim 7, wherein the UCI comprises at least one scheduling request (SR) bit or at least one acknowledgment (ACK) bit, or one combination of a SR bit and at least one ACK bit.

9. The apparatus of claim 7, wherein the UCI comprises more than two bits of UCI.

10. The apparatus of claim 7, wherein:
    the UCI comprises one or more acknowledgment or negative acknowledgment (ACK/NACK) bits; and
    the processor is further configured to determine a mapping, wherein the mapping randomizes a selection of shifts to different values of the ACK/NACK bits, based on the first shift index.

11. The apparatus of claim 10, wherein processor is configured to determine the mapping by determining the mapping that randomizes the selection of shifts to different values of the ACK/NACK bits based also on at least one of a slot index or a symbol index of the short PUCCH.

12. The apparatus of claim 7, wherein the processor is configured to select the CGS by calculating a sequence of values in the CGS using the sequence of exponent values.

13. An apparatus for wireless communications, comprising:

means for selecting a computer generated sequence (CGS) from a plurality of CGSs, wherein the means for selecting the CGS comprises:
  means for obtaining a sequence index, u, of the CGS; and
  means for looking up a sequence of exponent values, x(n), from a table, based on u, wherein the table comprises at least one of the sequences:

| x(0), . . . x(11) | | | | | | | | | | | |
|---|---|---|---|---|---|---|---|---|---|---|---|
| −3 | 1 | 3 | −1 | −1 | −3 | −3 | −1 | −1 | 3 | 1 | −3, |

| x(0), . . . x(11) | | | | | | | | | | | |
|---|---|---|---|---|---|---|---|---|---|---|---|
| −3 | 1 | −1 | −1 | 3 | 3 | −3 | −1 | −1 | −3 | −1 | −3, |

| x(0), . . . x(11) | | | | | | | | | | | |
|---|---|---|---|---|---|---|---|---|---|---|---|
| −3 | −1 | −3 | −1 | −1 | −3 | 3 | 3 | −1 | −1 | 1 | −3, |

| x(0), . . . x(11) | | | | | | | | | | | |
|---|---|---|---|---|---|---|---|---|---|---|---|
| −3 | 3 | −3 | 3 | 3 | −3 | −1 | −1 | 3 | 3 | 1 | 3 |

| x(0), . . . x(11) | | | | | | | | | | | |
|---|---|---|---|---|---|---|---|---|---|---|---|
| −3 | 1 | 3 | 3 | −1 | −1 | −3 | 3 | 3 | −3 | 3 | −3, or |

| x(0), . . . x(11) | | | | | | | | | | | |
|---|---|---|---|---|---|---|---|---|---|---|---|
| −3 | 3 | 3 | 3 | −1 | −3 | −3 | −1 | −3 | 1 | 3 | −3; | means for determining, based on different values of uplink control information (UCI) and a first shift index assigned to the apparatus, a shift to apply to the CGS; and
  means for transmitting the selected CGS, with the determined shift applied, in a short physical uplink control channel (PUCCH) to indicate the UCI.

14. A non-transitory computer-readable medium including instructions that, when executed by a processor, cause the processor to perform operations comprising:

selecting a computer generated sequence (CGS) from a plurality of CGSs, wherein selecting the CGS comprises:
  obtaining a sequence index, u, of the CGS; and
  looking up a sequence of exponent values, x(n), from a table, based on u, wherein the table comprises at least one of the sequences:

| x(0), . . . x(11) | | | | | | | | | | | |
|---|---|---|---|---|---|---|---|---|---|---|---|
| −3 | 1 | 3 | −1 | −1 | −3 | −3 | −1 | −1 | 3 | 1 | −3, |

| x(0), . . . x(11) | | | | | | | | | | | |
|---|---|---|---|---|---|---|---|---|---|---|---|
| −3 | 1 | −1 | −1 | 3 | 3 | −3 | −1 | −1 | −3 | −1 | −3, |

| x(0), . . . x(11) | | | | | | | | | | | |
|---|---|---|---|---|---|---|---|---|---|---|---|
| −3 | −1 | −3 | −1 | −1 | −3 | 3 | 3 | −1 | −1 | 1 | −3, |

| x(0), . . . x(11) | | | | | | | | | | | |
|---|---|---|---|---|---|---|---|---|---|---|---|
| −3 | 3 | −3 | 3 | 3 | −3 | −1 | −1 | 3 | 3 | 1 | 3 |

| x(0), . . . x(11) | | | | | | | | | | | |
|---|---|---|---|---|---|---|---|---|---|---|---|
| −3 | 1 | 3 | 3 | −1 | −1 | −3 | 3 | 3 | −3 | 3 | −3, or |

| x(0), . . . x(11) | | | | | | | | | | | |
|---|---|---|---|---|---|---|---|---|---|---|---|
| −3 | 3 | 3 | 3 | −1 | −3 | −3 | −1 | −3 | 1 | 3 | −3; | determining, based on different values of uplink control information (UCI) and a first shift index assigned to an apparatus including the processor, a shift to apply to the CGS; and
  transmitting the selected CGS, with the determined shift applied, in a short physical uplink control channel (PUCCH) to indicate the UCI.

* * * * *